United States Patent
Fujimoto

(10) Patent No.: US 7,437,243 B2
(45) Date of Patent: Oct. 14, 2008

(54) DETECTING DEVICE AND METHOD TO DETECT AN OBJECT BASED ON A ROAD BOUNDARY

(75) Inventor: Kazumi Fujimoto, Yokohama (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 92 days.

(21) Appl. No.: 11/378,540

(22) Filed: Mar. 18, 2006

(65) Prior Publication Data

US 2006/0217886 A1    Sep. 28, 2006

(30) Foreign Application Priority Data

Mar. 22, 2005   (JP)   .............................. 2005-081511

(51) Int. Cl.
*G06K 9/00* (2006.01)
*G05D 1/02* (2006.01)
(52) U.S. Cl. ................... 701/300; 382/107; 340/436
(58) Field of Classification Search ............ 701/300; 382/107; 340/436
See application file for complete search history.

(56) References Cited

U.S. PATENT DOCUMENTS

| | | | | |
|---|---|---|---|---|
| 5,777,690 A * | 7/1998 | Takeda et al. | ............. | 348/699 |
| 6,477,260 B1 * | 11/2002 | Shimomura | ............. | 382/106 |
| 6,590,521 B1 * | 7/2003 | Saka et al. | ............. | 342/70 |
| 7,038,577 B2 * | 5/2006 | Pawlicki et al. | ............. | 340/435 |
| 7,250,593 B2 * | 7/2007 | Nagasawa | ............. | 250/208.1 |
| 2005/0152580 A1 * | 7/2005 | Furukawa et al. | ............. | 382/103 |

FOREIGN PATENT DOCUMENTS

| | | |
|---|---|---|
| JP | 2001-209804 A | 8/2001 |
| JP | 2003-067752 A | 3/2003 |
| JP | 2004-220059 A | 8/2004 |

* cited by examiner

*Primary Examiner*—Mark Hellner
(74) *Attorney, Agent, or Firm*—Young Basile

(57) ABSTRACT

A detecting device and corresponding method for detecting an object in an image where the image is captured by an image pickup device mounted on a vehicle. A controller is coupled to the image pickup device. The controller extracts pixels of the image captured by the image pickup device, calculates a side direction velocity component based upon the extracted pixels, detects a road boundary based upon the calculated side direction velocity component, and detects a moving direction of the object based upon a relationship between the road boundary and the object.

21 Claims, 20 Drawing Sheets

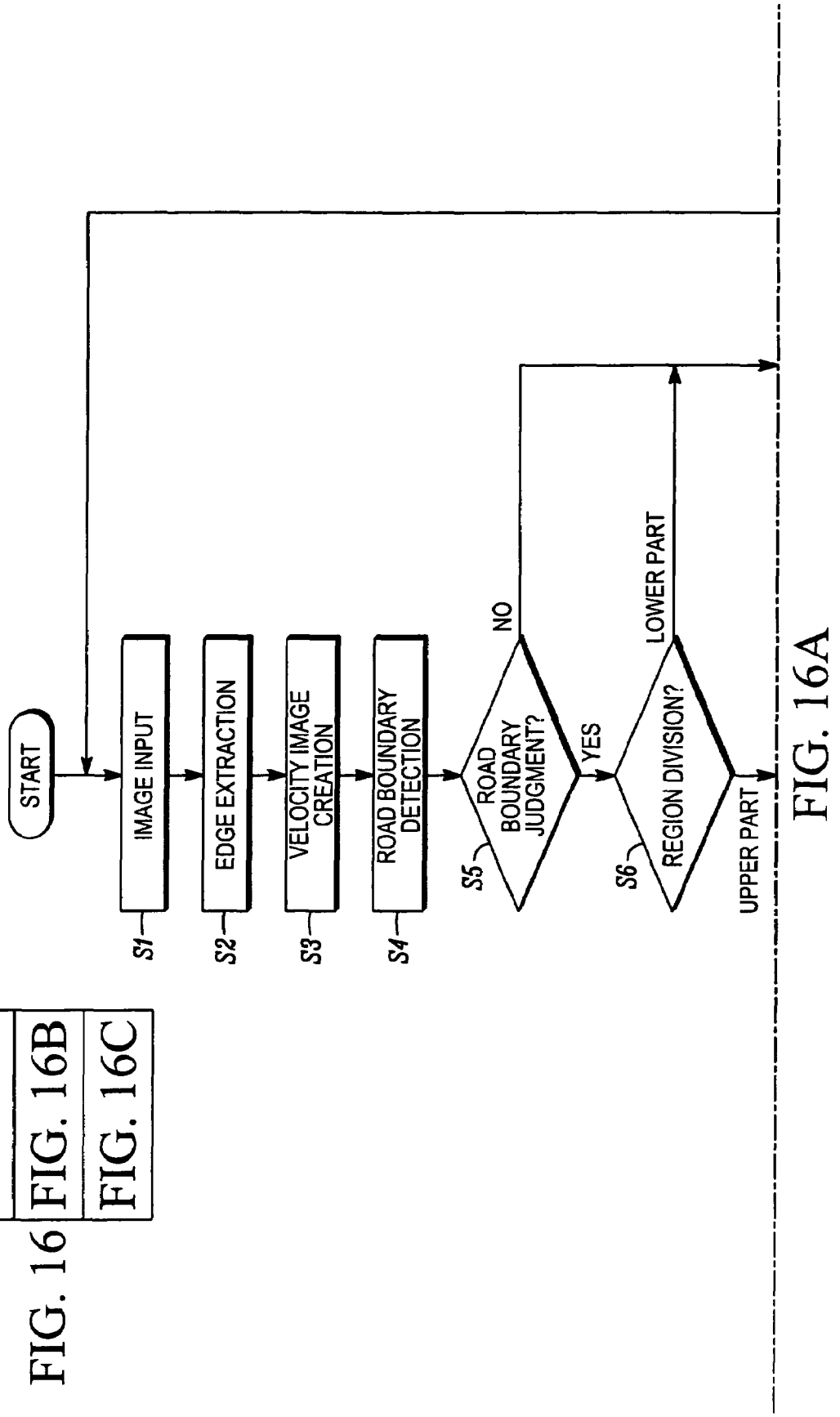

DETECTING DEVICE AND METHOD TO DETECT AN OBJECT BASED ON A ROAD BOUNDARY

TECHNICAL FIELD

The present invention relates to a vehicle-mounted object detector that processes images picked up by a camera to detect objects present in the images, and relates to an object detection method.

BACKGROUND

An image processor is known from Japanese Kokai Patent Application No. 2004-220059. With this known image processor, the optical flow at each point is calculated from the image, the optical flows are grouped into multiple regions, and the background and independent moving objects are detected based on the optical flow information for each region.

In this conventional device, optical flow is calculated and processing is performed for the entire image to detect the background and moving objects. Because there are many differences in the background and objects that appear based upon their position in the image, the problem produced is that errors can occur when the same processing is executed for the entire image to detect the background and moving objects.

BRIEF SUMMARY OF THE INVENTION

Accordingly, there is provided an apparatus wherein pixels of an image capture by an image pickup device are extracted, a side direction velocity component is calculated based upon the extracted pixels, a road boundary is detected based upon the calculated side direction velocity component, and the moving direction of the object is determined based upon a relationship between the road boundary and the object.

Another embodiment is an apparatus for detecting objects in an image obtained by an image pick-up device mounted on a vehicle. The apparatus comprises edge-extraction means for extracting edges of at least one object present in multiple image frames, road boundary detection means for detecting a road boundary in the image based on respective lateral speeds of movement of at least some of the extracted edges, and direction-of-movement determination means for determining a direction of movement of an object based on the road boundary and respective lateral speeds of movement of others of the extracted edges. This aspect of the invention can include edge velocity calculation means for calculating the respective lateral speeds of movement of the extracted edges based upon at least two image frames.

Another embodiment is a method of detecting objects in an image obtained by an image pick-up device mounted on a vehicle. The method includes the steps of extracting edges of at least one object present in multiple image frames, detecting a road boundary in the image based on respective lateral speeds of movement of at least some of the extracted edges, and determining a direction of movement of an object based on the road boundary and respective lateral speeds of movement of others of the extracted edges. The method can include the step of calculating a lateral speed of movement in the image of the extracted edges based upon at least two image frames.

A method of detecting objects in an image obtained by an image pick-up device mounted on a vehicle according to another embodiment comprises extracting edges of at least one object present in multiple image frames, determining an existence of a road boundary in the image based on respective lateral speeds of movement of at least some of the extracted edges, determining a direction of movement of an object according to a first method when the object is outside the road boundary; and determining the direction of movement of the object according to a second method when one of the road boundary does not exist and at least a portion of the object is inside the road boundary.

Other inventive features of the apparatus and method are described in further detail hereinafter.

BRIEF DESCRIPTION OF THE DRAWINGS

The description herein makes reference to the accompanying drawings wherein like reference numerals refer to like parts throughout the several views, and wherein:

FIGS. 16A-16C show a flow chart illustrating processing by the vehicle-mounted object detector in the second embodiment;

DETAILED DESCRIPTION OF EMBODIMENTS OF THE INVENTION

Figure 1:
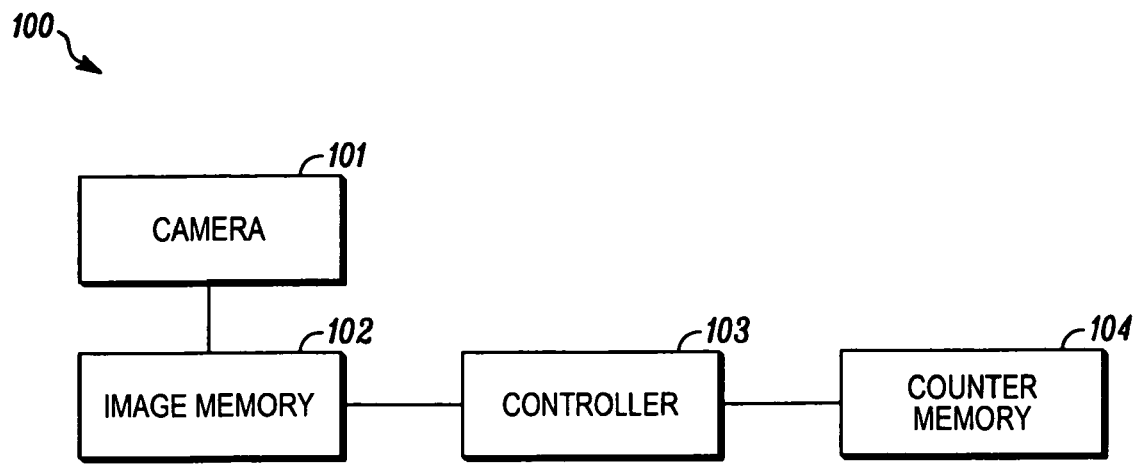
FIG. 1 is a block diagram showing the configuration of one aspect of a vehicle-mounted object detector in a first embodiment.

FIG. 1 is a block diagram showing the configuration of one aspect of a vehicle-mounted object detector in a first embodiment. A vehicle-mounted detector 100 has a camera 101 that is mounted on the vehicle. Camera 101 performs the function of picking up images in front of the vehicle, and it usually incorporates an image memory 102 that stores images picked up by the camera 101. Image memory 102 can also be separate from the camera 101 as shown in FIG. 1. The detector 100 also includes a controller 103 that incorporates a central processing unit (CPU), memory and other peripheral circuitry and that executes various types of processing described below. Briefly, controller 103 performs processes of, for example, edge extraction, edge velocity calculation, road boundary detection, object detection and the determination of direction-of-movement. Finally, the detector 100 includes a counter memory 104 that stores the count value of a pixel counter described below.

Figure 2:
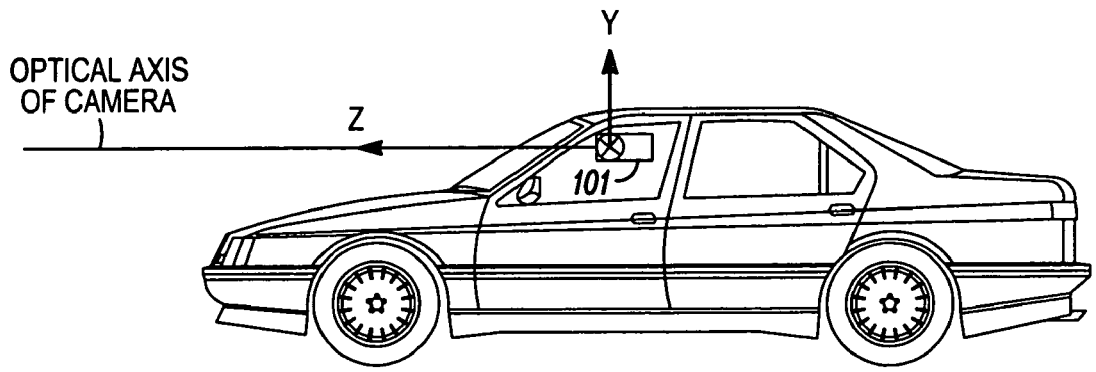
FIG. 2 shows an example of camera installation on a vehicle.
Figure 2:
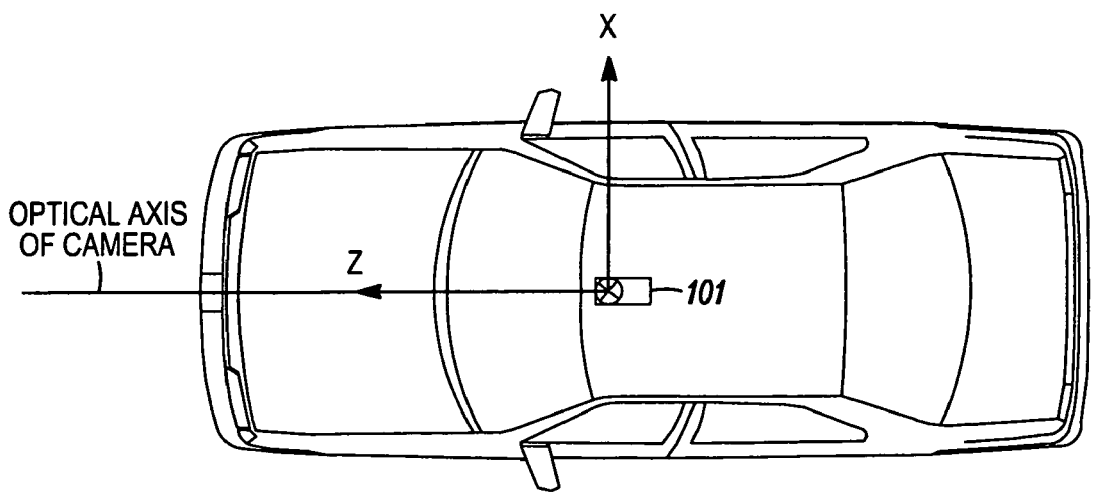

Camera 101 is a high-speed camera that has an image pickup element, for example a CCD or CMOS, that continuously picks up images in front of the vehicle while the vehicle is moving, preferably picking up the images at an extremely miniscule fixed time interval Δt, for example, 2 ms (frame rate=500 frames per second). The camera 101 outputs each frame to image memory 102. Here, camera 101 is mounted at the top front in the passenger compartment of the vehicle, as shown in FIG. 2. Camera 101 is set so that its viewing axis direction Z faces directly toward the front of the vehicle, image pickup surface horizontal axis X is parallel with the ground surface, and image pickup surface vertical axis Y is perpendicular to the ground surface.

Figure 3:
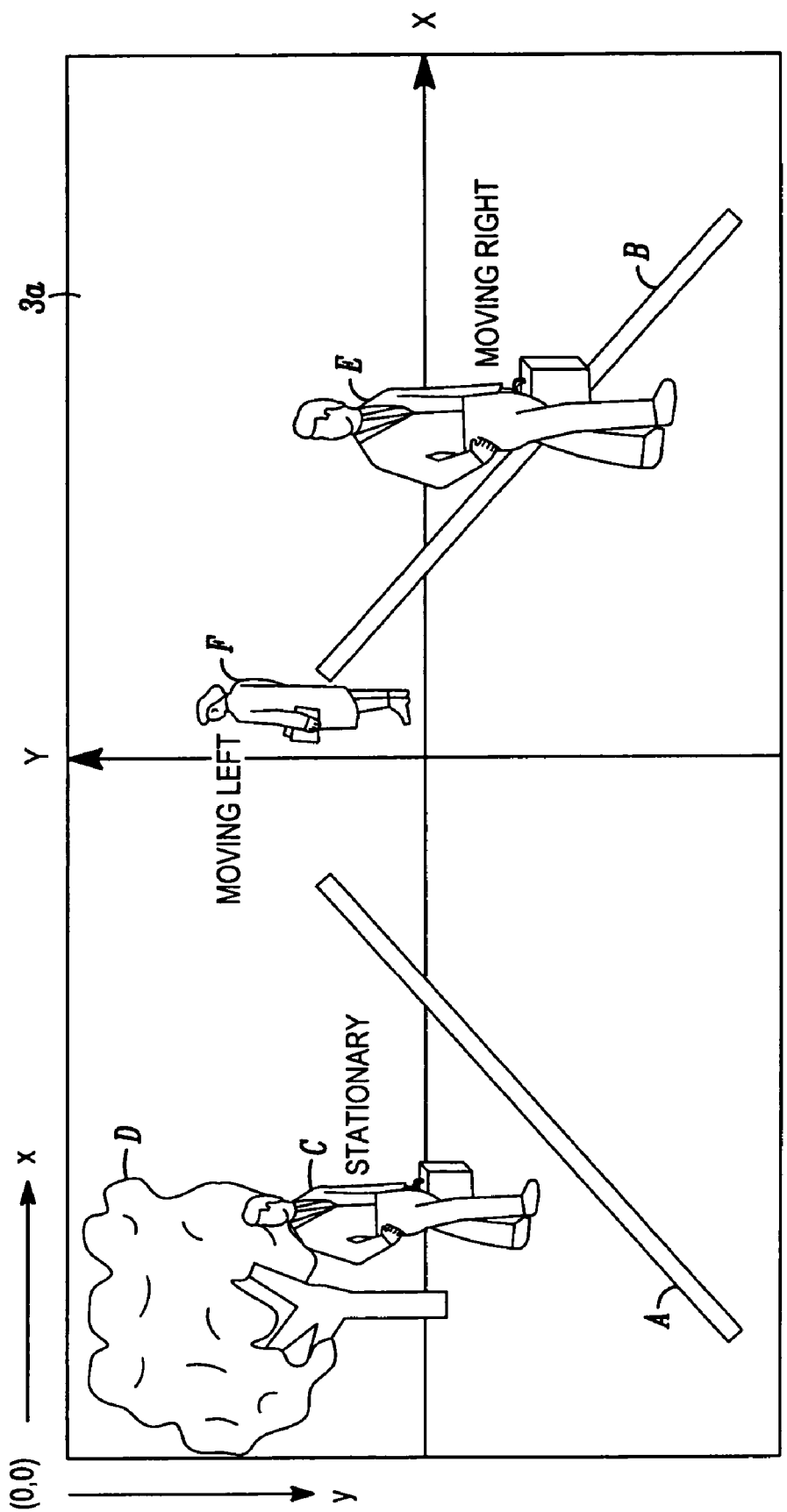
FIG. 3 shows an example of a pickup image in the first embodiment.

An example of an image picked up by camera 101 is shown in FIG. 3. A pickup image 3a produced by camera 101 is represented with an x-y coordinate system (camera coordinates) using the top left corner of the image as the origin and from left to right as the x-axis and from top to bottom as the y-axis. Here, in FIG. 3, pickup image 3a includes the road boundary present on the left and right sides of the road, that is, white lines A and B, a stationary pedestrian (person) C present in front of the vehicle, a stationary background tree D, a pedestrian E moving to the right in front of the vehicle, and a pedestrian F moving toward the left. That is, pickup image 3a includes white lines A and B drawn on the road, stationary object C present in front of the vehicle, moving objects E and F present in front of the vehicle, and background D.

Controller 103 detects objects present in the pickup image 3a by separating the background and objects from within pickup image 3a taken by camera 101 shown in FIG. 3. First, the speed of movement in the lateral direction (x-axis direction) by an object present in pickup image 3a is calculated, and a velocity image is created in which the lateral direction and speed of movement by the object in pickup image 3a are represented by class values.

More specifically, the image captured by camera 101 is read from image memory 102 and a filter for edge extraction is applied to pickup image 3a to perform edge extraction processing. Then, for each edge extracted, the speed of movement of each edge in pickup image 3a is calculated by performing the image processing as explained below. First, a thinning process is applied to the edges in pickup image 3a to accurately find the center of the edges. Then the thinned edges are expanded so that the edge width will be a fixed width, for example, a width of 3 pixels. By normalizing the extracted edges in this way, an edge image can be obtained in which each edge has a uniform width.

Figure 4A:
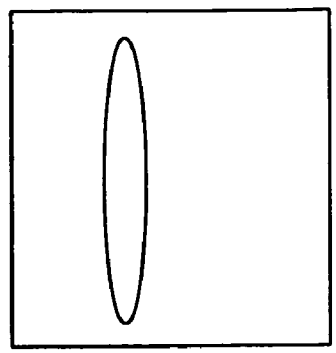
FIGS. 4A-4C show the edge normalization method.
Figure 4B:
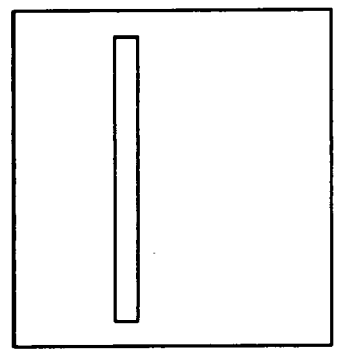
Figure 4C:
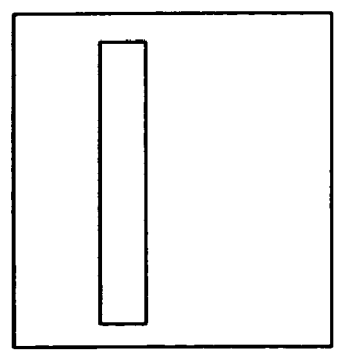

FIGS. 4A-4C shows an example of the above-mentioned process for normalizing extracted edges and obtaining an edge image. That is, the thinning process is performed for the edge obtained by digitization shown in FIG. 4A to obtain the edge after thinning shown in FIG. 4B. Then the thinned edge is expanded to provide a fixed width for the edge as shown in FIG. 4C.

One implementation of this processing for normalizing extracted edges and obtaining an edge image as shown in FIGS. 4A-4C is more clearly described with reference to FIGS. 17 and 18. The edge extracting section 202 extracts an edge of an image using a SOBEL filter for the frame image input from the camera 101. The edge standardizing section 203 standardizes an edge width of the edge, extracted by the edge extracting section 202, to a given pixel number in a shift direction of the object.

Figure 17:
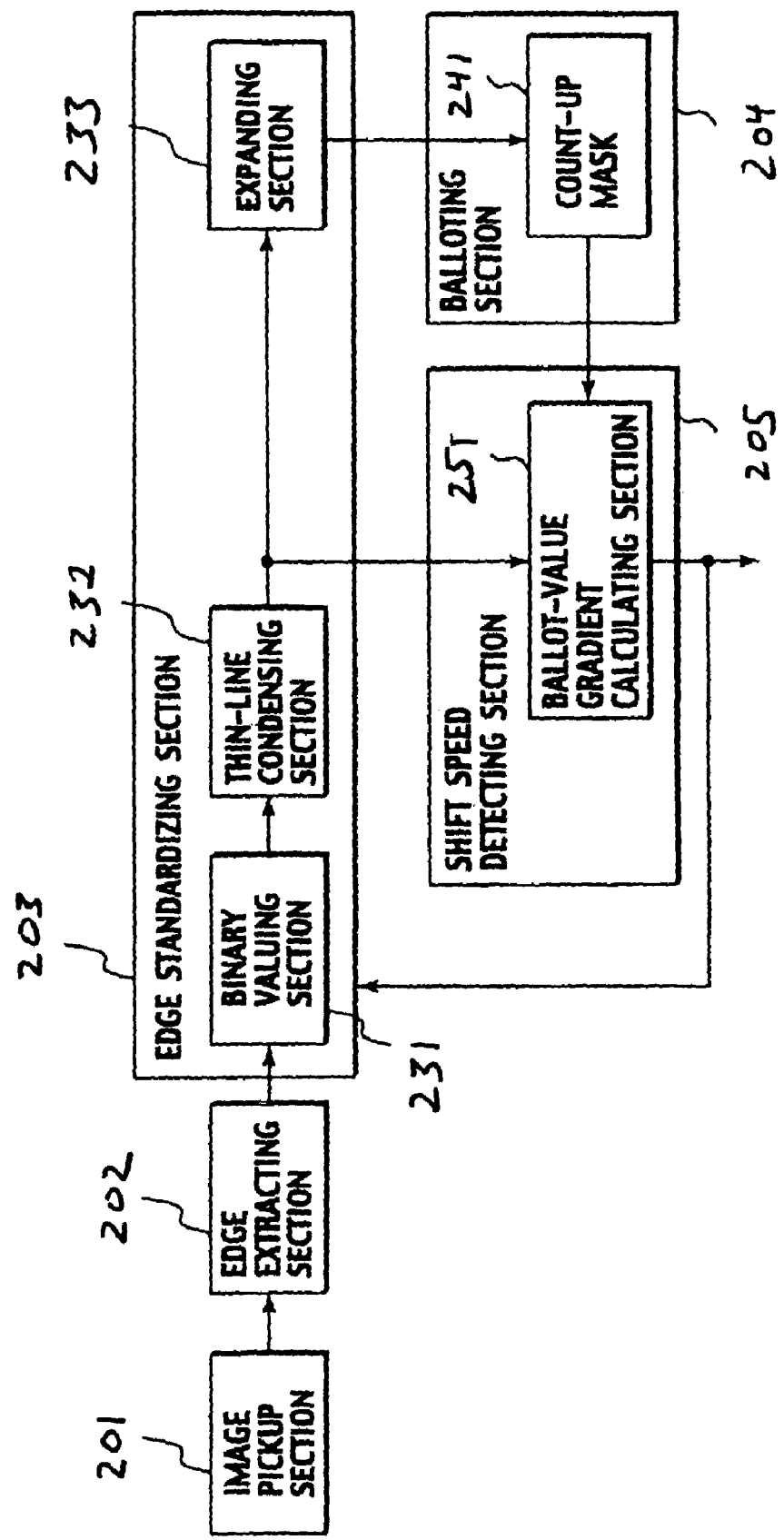
FIG. 17 is a block diagram showing a detailed structure an edge-width standardizing section.
Figure 18:
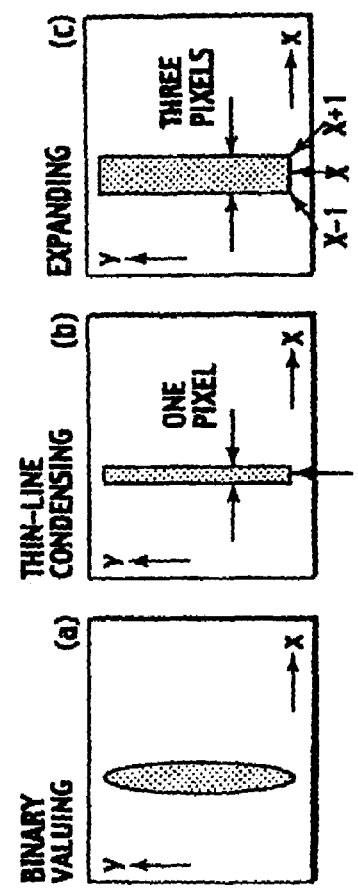
FIG. 18 is a view illustrating thin-line condensing operation and expanding operation by the edge-width standardizing section shown in FIG. 17.

As shown in FIG. 17, the edge standardizing section 203 is comprised of a binary valuing section 231 that allows the edge image, generated by the edge extracting section 202, to be valued in a binary state. The edge standardizing section 203 also includes a thin-line condensing section 232 that converts the edge width of the edge that is valued in the binary state by the binary valuing section 231 in a thin line to a given pixel number. Finally, the edge standardizing section 203 comprises an expanding section 233 that expands the edge width of the edge, which is formed in the thin line by the thin-line condensing section 232, to a given pixel number.

With the edge standardizing section 203 so configured, if the edge image is input from the edge extracting section 202, the binary valuing section 231 executes binary valuing operation on the edge image. During this binary valuing operation, a pixel of a pixel area whose edge is detected is allocated to be "1" while a pixel of a pixel area whose edge is not detected is allocated to be "0". Based on these allocated values, a binary value image is generated as shown in frame image (a) in FIG. 18.

Next, the thin-line condensing section 232 executes thin-line condensing operation for the binary valued image that is valued in a binary state by the binary valuing section 231. The thin-line condensing operation contracts the detected edge to a given pixel number. With the frame image (b) shown in FIG. 18, the edge width of the edge is condensed to a given pixel number of one pixel. Upon condensing the edge to a given pixel width in such a way, the thin-line condensing section 232 sets a center position for the edge.

The expanding section 233 executes an expanding operation for expanding the edge width of the edge whose line is condensed by the thin-line condensing section 232. During this expanding operation, the edge width is expanded in both shift directions of the edge, that is, in one shift direction away from a center position of the edge, set by the thin-line condensing operation, and in the other direction opposite to the one shift direction. With the frame image (c) in FIG. 18, the edge width is expanded in both directions by one pixel, i.e., in the shift direction (positively on the x-axis) away from the pixel position X, forming the center of the edge, and the other direction (negatively on the x-axis) opposite to the shift direction for thereby standardizing the edge width of the edge to three pixels in this example.

Upon executing the thin-line condensing and expanding operations in such a way, the edge standardizing section 203 standardizes the edge width of the edge, extracted by the edge extracting section 202, in a given pixel number toward the shift directions of the edge.

Although the edge width can be standardized according to these steps, an alternative may be such that the edge extracting section 202 detects a peak position of the detected edge after which the edge width is standardized in a way to cause the edge width to have pixel widths each by a given pixel number in the shift direction of the edge and in the other direction opposite the shift direction with respect to the edge peak position.

Next, the balloting section 204 executes the operation to count up the standardized edges standardized as set forth above. This count-up operation is implemented such that values of memory addresses of memory regions whose standardized edges are detected are counted up while the values of memory addresses of pixel areas whose standardized edges are not detected are initialized. More specifically, the count-up operation of the balloting section 204 is shown in FIG. 19.

Initially, it is supposed that in a frame image (c) at time t, the edge width is expanded from a pixel position, X, in both pixel directions, X−1 to the other pixel direction X+1, a shift direction of the edge and the other direction opposite to the shift direction by one pixel, respectively.

In this case, the balloting section 204 counts up ballot values of the pixel positions X−1, X and X+1, whose standardized edges are detected by the count-up mask 241 one by one, and a ballot value of the pixel areas, whose standardized edges are not detected, is reset.

Figure 19:
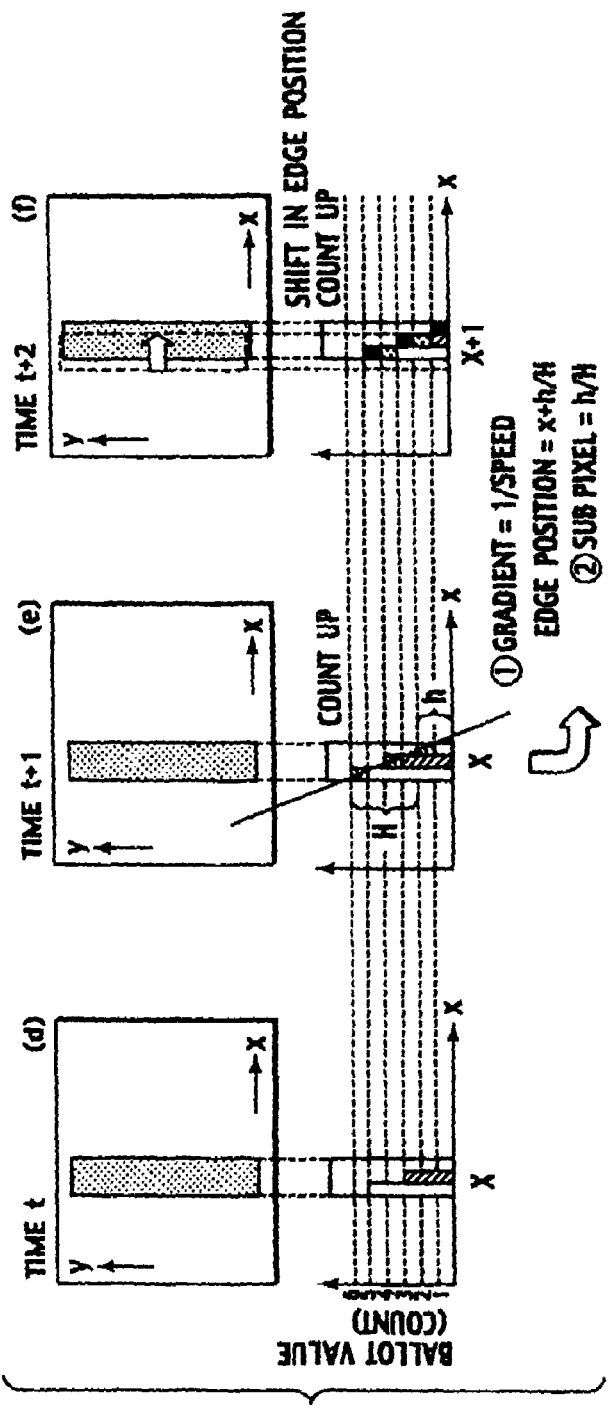
FIG. 19 is a view illustrating a count up operation of a balloting module.

In a frame image (d) in FIG. 19, since the standardized edges are detected on the pixel positions X−1, X and X+1 at time t, the ballot values are counted up at the respective pixel positions one by one such that the pixel position X+1 takes the ballot value of 1, the pixel position X takes the ballot value of 3 and the pixel position X−1 takes the ballot value of 5.

No edge shifts at time t+1, so the standardized edges are detected at the pixel positions X−1, X and X+1, and, as shown in the frame image (e) in FIG. 19, the ballot values of the pixel positions X−1, X and X+1 are further counted up one by one such that the pixel position X+1 takes the ballot value of 2, the pixel position X takes the ballot value of 4 and the pixel position X−1 takes the ballot value of 6.

At time t+2, the edge shifts in a positive direction on the x-axis by one pixel upon which the standardized edges are detected at the pixel positions X, X+1 and X+2. Accordingly, the ballot values of the pixel positions whose standardized edges are detected are counted up, while the ballot values of pixel positions whose standardized edge are not detected are reset. As a result, as shown by a frame image (f) in FIG. 19, the pixel position X+2 takes the ballot value of 1, the pixel position X+1 takes the ballot value of 3 and the pixel position X takes the ballot value of 5. In addition, the ballot value of the pixel position X−1, whose standardized edge is not detected, is reset to "0".

In such a way, the balloting section 204 counts up the ballot values of the pixel positions whose standardized edges are detected, while resetting ballot values of the pixel areas whose standardized edges are not detected.

While in FIG. 19, the ballot values are detected at a sum of three positions, i.e., the pixel positions X−1, X and X+1, as the pixel areas of the standardized edges, the ballot values of any positions may be detected provided that the gradient of the ballot values is obtained as will be described below.

Further, if the frame rate is set to be sufficiently higher than the speed in which the edge (at a central pixel position of the standardized edge) shifts, the standardized edges are detected a number of times on the same pixel areas for frame images successively appearing in time series. In the case of FIG. 19, the standardized edge in the pixel position X is detected two times, at times t and t+1. Consequently, the ballot value, resulting when the ballot values of the pixel areas whose standardized edges are detected, is substantially equivalent to a time interval (frame number) during which the standardized edges are detected in the relevant pixel area. Particularly, this means how many number of frames are needed after the edge has shifted for the minimum ballot value h, among the ballot values of the pixel areas on which the standardized edges are located, to be located on the same pixel area.

Subsequently, the shift speed detecting section 205 calculates a shift speed, a shift direction and a position of the edge. The shift speed detecting section 205 initially calculates a gradient of the ballot values of the pixel areas of the standardized edges. Depending on the gradient of the ballot value as calculated by the ballot-value gradient calculating section 251, the shift speed detecting section 205 calculates the shift direction, the shift speed and the position of the edge.

This calculation method is described with reference to FIG. 19. In case of the frame image (e) in FIG. 19, the pixel positions X−1, X and X+1 have the ballot values of 6, 4 and 2, respectively. Therefore, upon subtracting the ballot value 2 at the pixel position X+1 from the ballot value 6 at the pixel position X−1, the gradient of the ballot value can be calculated as H=(6*2)/2=2. This means that $H=\{$(Time Interval needed for Standardized Edge to shift from Pixel Position $X$−1 to Pixel Position $X$+1)$\}/$(2 Pixels).

Accordingly, the gradient H of the ballot values is substantially equivalent to the time interval (frame number) needed for the standardized edges to pass across the pixel position X. That is, the gradient H of the ballot values is equivalent to obtain information about how many number of frames are needed for the standardized edge to shift by one pixel, and the shift speed 1/H of the edge can be calculated based on the gradient H of the ballot value.

In the frame image in FIG. 19, four frames are needed for the standardized edge to shift by one pixel and, hence, the shift speed of the edge can be calculated to be 1/4 (pixel/frame).

Further, the shift direction of the edge can be judged on a size of the ballot value. The pixel area, appearing when the edge shifts and a new standardized edge is detected, has a ballot value of 1 that forms a minimal value among the ballot values of the respective pixel positions. Consequently, the ballot value in a direction in which the edge shifts is small, and the ballot value in a direction opposite to the direction in which the edge shifts is large. It thus becomes possible to judge the shift direction of the edge.

In addition, if the frame rate is set to be sufficiently higher than the speed at which the edge shifts, it is assumed that the object is moving at a constant speed. Moreover, among the ballot values of the pixel areas on which the standardized edges are located, the minimal ballot value "h" means that the standardized edge is located on the same position for a time interval in which the standardized edge is detected at the relevant pixel position, that is, the given number of frames needed after the edge has shifted.

From the foregoing, where the center position of the edge is X, the position of the edge can be expressed as below.

Current Position of Edge=$X$+$h/H$

In the frame image (e) in FIG. 19, since at time t+1 the edge is detected in the same pixel position two successive frames at the edge speed of 1/4 (pixel/frame), the pixel position of the edge at time t+1 can be calculated to assume a position shifted from the pixel position by:

2(Frame)×{1/4(Pixel/Frame)}=0.5 Pixel.

Upon calculating the shift speed, the shift direction and the position of the edge in the manner discussed, the shift speed detecting section 205 transmits the calculated shift speed to the edge standardizing section 203. Upon receipt of the shift speed, the edge standardizing section 203 alters the edge width of the edge to be standardized. In the frame image (f) in FIG. 19, although the edge width subsequent to the standardizing operation has three pixels in respect of the shift direction of the edge, the edge width in respect of the shift direction of the edge is altered to be greater than the three pixels when the received shift speed is high. In contrast, when the shift speed is low, the edge width in respect of the shift direction of the edge is altered to be smaller than the three pixels.

Thus, altering the edge width for standardization enables the edge width to be standardized such that the standardized edges overlap one another between the frame images successive in time series in accordance with the shift speed, making it possible to expand a range of the shift speed available for detection.

Additional background information with respect to edge extraction may be found in U.S. patent application Ser. No. 11/146,041 filed Jun. 7, 2005 and entitled "Motion Detection Apparatus and Motion Detection Method," which is hereby incorporated by reference in its entirety, and in Japanese Patent Applications Laid-open No. P2004-278250 with a filing data of Sep. 24, 2004 and Laid-open P2004-279394 with a filing data of Sep. 27, 2004, both of which are hereby incorporated by reference.

In summary, the count value of the pixel counter corresponding to pixels at which an edge is present in the current edge image is updated in the pixel counter saved in counter memory 104. The pixel counter is a counter corresponding to each pixel of an edge image. A count of one is added to the count value of a pixel counter corresponding to a pixel at which an edge is present, and the count value of a pixel counter corresponding to a pixel at which no edge is present is initialized at zero. By so updating the count value for each frame taken continuously by camera 101, pixels at which an edge is present for a relatively long time will have a larger count value. Pixels at which an edge is present for a relatively short time will have a smaller count value.

The difference in times for which an edge is present at each pixel is calculated by finding the difference in the count values for pixel counters corresponding to pixels that are adjacent laterally, and the time required for that edge to move one pixel is obtained. After this, the lateral speed of movement in the image space at each pixel can be calculated by taking the inverse of that value. The lateral direction of movement in the image space at each pixel can be calculated by determining the direction of movement. The lateral speed of movement and direction of movement in the image space at each pixel correspond to the lateral speed of movement and direction of movement of an edge included at each pixel. In this way, the velocity components of an edge at each pixel in pickup image 3a, that is, the direction of movement and speed of movement of the edge, can be calculated.

A velocity image is created in which the velocity components of the edge in pickup image 3a calculated using the processing above are represented by prescribed class values. With the velocity image in the first embodiment, such as the velocity image 5a shown in FIG. 5, pixels in which velocity in the lateral direction is detected are represented by round dots. The speed of movement is represented by the size of the dots. The larger the dot, the faster the pixel. The direction of movement is also shown where velocity to the right is represented with a black dot, and velocity to the left is represented with a white dot.

Figure 5:
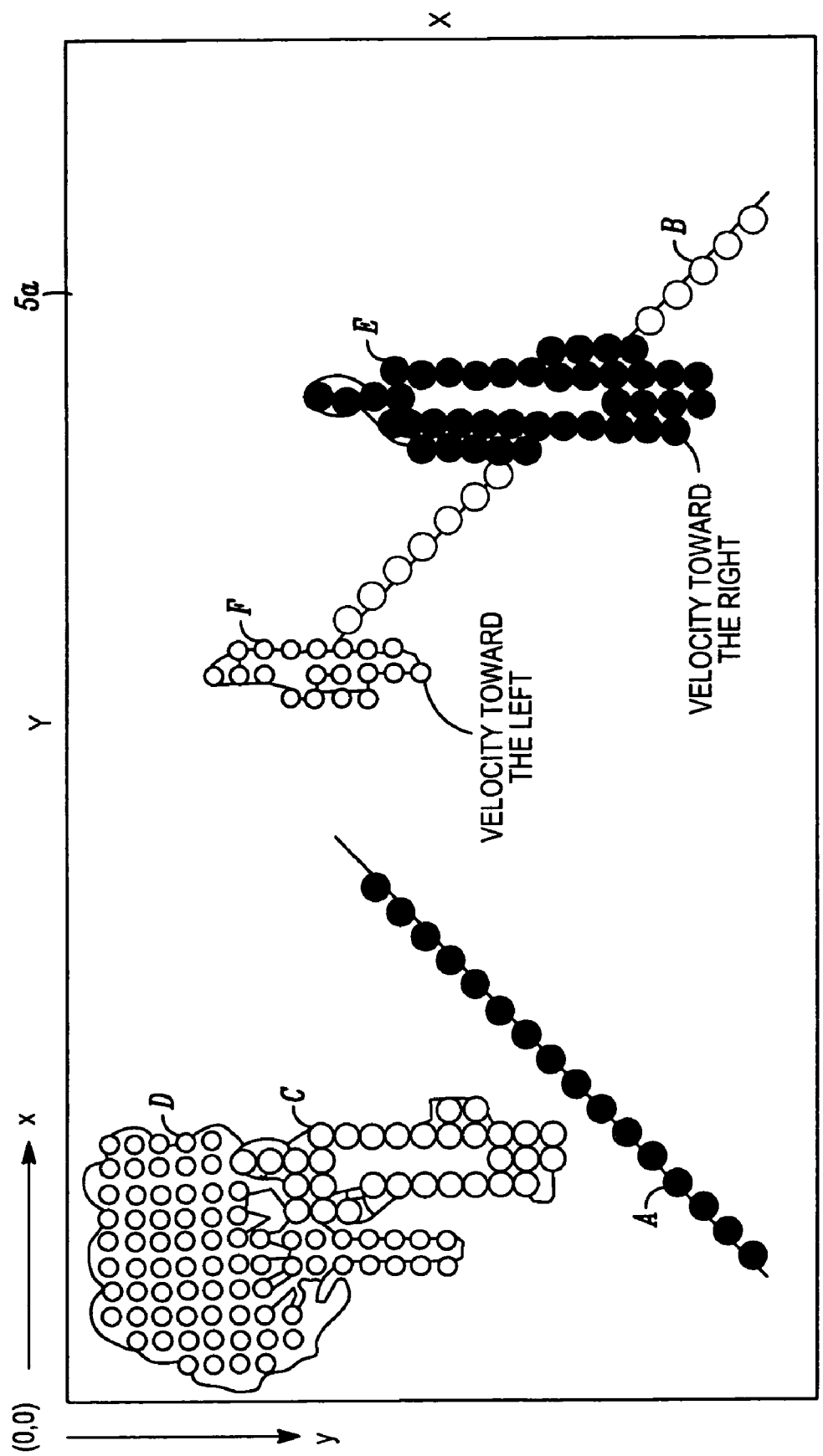
FIG. 5 shows an example of a velocity image in the first embodiment.

In FIG. 5, from white line A on the left side of the road and pedestrian E moving toward the right, velocity toward the right side of the image is detected. From white line B on the right side of the road, stationary passenger C, tree D and passenger F moving toward the left, velocity toward the left side of the image is detected.

Figure 6:
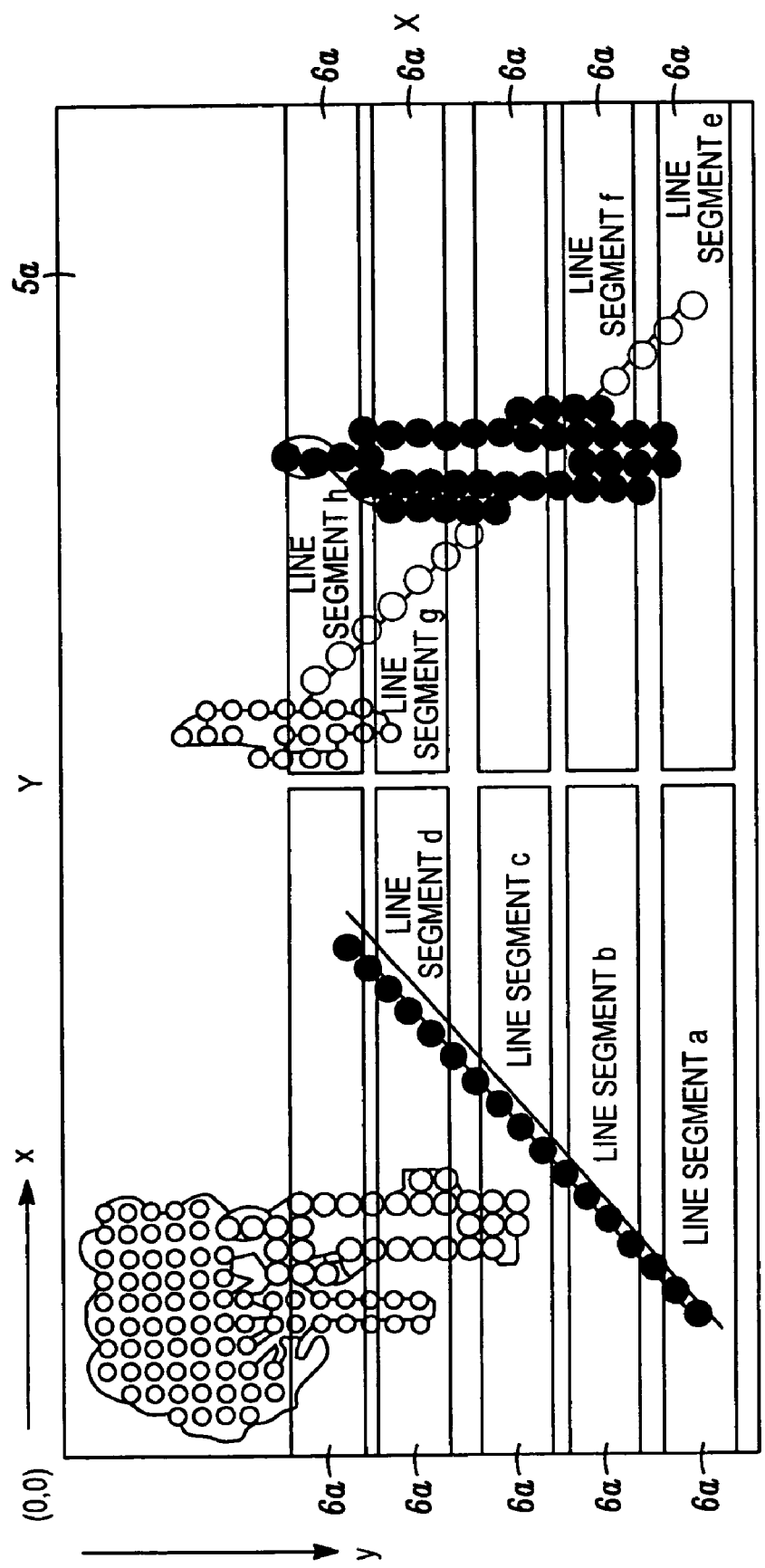
FIG. 6 shows an example of detecting road boundaries in the velocity image according to FIG. 5.

Next, the road boundary detection region for detecting a road boundary present in the image is set for velocity image 5a. For example, as shown in FIG. 6, velocity image 5a is halved in the x-axis direction and multiple road boundary detection regions 6a. The regions 6a are long laterally and are established equally spaced in each of the halved left and right regions. Then pixels that have the same velocity components in each of the established road boundary detection regions 6a are connected with a straight line and diagonal lines present in each road boundary detection region 6a, that is, line segments a-h, are detected. The result is that when the line segments detected in each road boundary detection region 6a present at the right and left of velocity image 5a are aligned on one straight line, the straight line connecting the segments is determined to be a road boundary, for example, a white line.

In this way, in the example shown in FIG. 6, line segments a-d detected from road boundary region 6a established on the left side of velocity image 5a are aligned in one straight line, so that the straight line that connects line segments a-d is determined to be a road boundary at the left side of the road, that is, white line A. Line segments e-h detected from road boundary region 6a established at the right side of velocity image 5a are aligned in one straight line, so that the straight line that connects line segments e-h is determined to be the road boundary at the right side of the road, that is, white line B.

Figure 7:
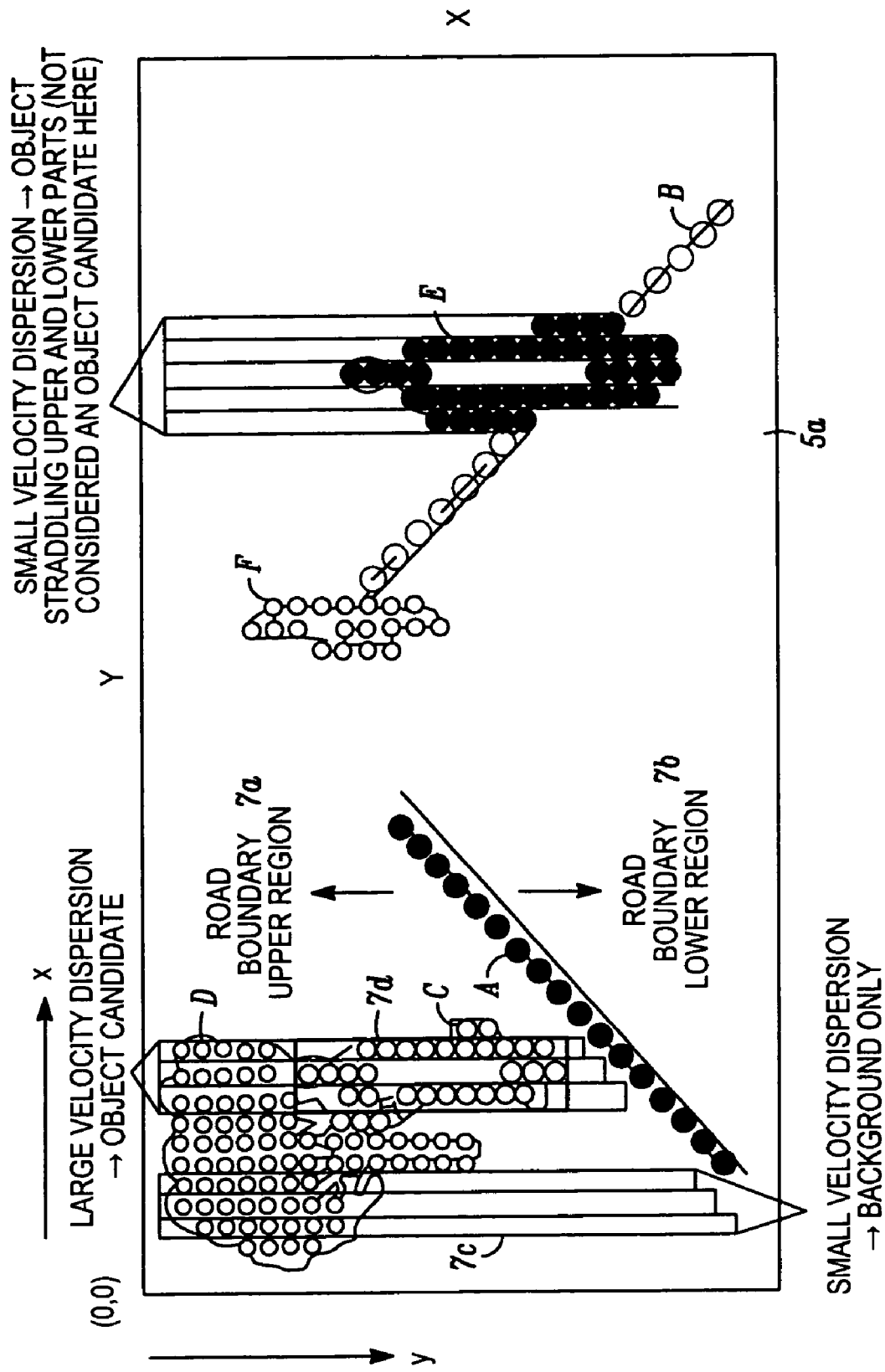
FIG. 7 shows an example of dividing the velocity image according to FIG. 5 into a road boundary upper region and a road boundary lower region in the first embodiment.

Velocity image 5a is divided using the road boundaries detected in this way. That is, as shown in FIG. 7, velocity image 5a is divided into top and bottom using the region above detected white lines A and B, that is, the area outside the road, as road boundary upper region 7a and the region below white lines A and B, that is, the area inside the road, as road boundary lower region 7b.

Generally, because road boundary upper region 7a established in this way is outside the road, distant scenery and buildings by the side of the road primarily appear in this area. Because road boundary lower region 7b is within the road, in this area the road surface appears. For this reason, in velocity image 5a the speed of movement of the background is different between road boundary upper region 7a and road boundary lower region 7b. Taking this into consideration, objects will be detected with different object detection methods between road boundary upper region 7a and road boundary lower region 7b as described below.

First, the method for detecting objects present within road boundary upper region 7a will be explained. In road boundary upper region 7a, objects are detected as follows taking into account that, in a region above the road boundary, velocity differences occur due to the difference in depth between objects and the background.

In the method, multiple regions having a prescribed width, for example, a width of one pixel and vertically oriented from the bottom edge to the top edge of the road are established as object-detection regions 7c in established road boundary upper region 7a. The interior of road boundary upper region 7a is divided by object-detection regions 7c. Then, the velocity dispersion in each object-detection region 7c is calculated. If the calculated velocity dispersion is greater than a prescribed value, it is determined that an object candidate is present in that object-detection region 7c. On the other hand, if the calculated velocity dispersion is less than a prescribed value, it is determined that background is present in that object-detection region 7c. Object candidates and background present in velocity image 5a can be separated in this way.

Next, the velocity components of adjacent object-detection regions 7c are compared in those object-detection regions 7c in which an object candidate is present. If they have the same velocity components, it is determined that the same object candidate is present in the object-detection regions 7c having the same velocity components. Those object detection candidate regions 7c are then joined. The joined object detection candidate regions are separated into an area that has the same velocity components as above-mentioned object-detection regions 7c in which background is present and into an area that has velocity components different from object-detection regions 7c in which background is present. This separation is based on the distribution of velocity components in the joined object detection candidate regions.

In this way, the joined object detection candidate regions can be divided into a region that includes background and a region that includes an object. By establishing an object candidate region 7d only for a region that includes an object, an area in which an object candidate is present in velocity image 5a can be specified. Here, however, when an object candidate region 7d is present at the bottom edge of road boundary upper region 7a, that is, adjacent to the road boundary, it is determined whether the area that has the same velocity components is straddling the road boundary. When the area having the same velocity components is straddling the road boundary, it will be excluded from processing because the object detection with the processing described below is performed.

Figure 8:
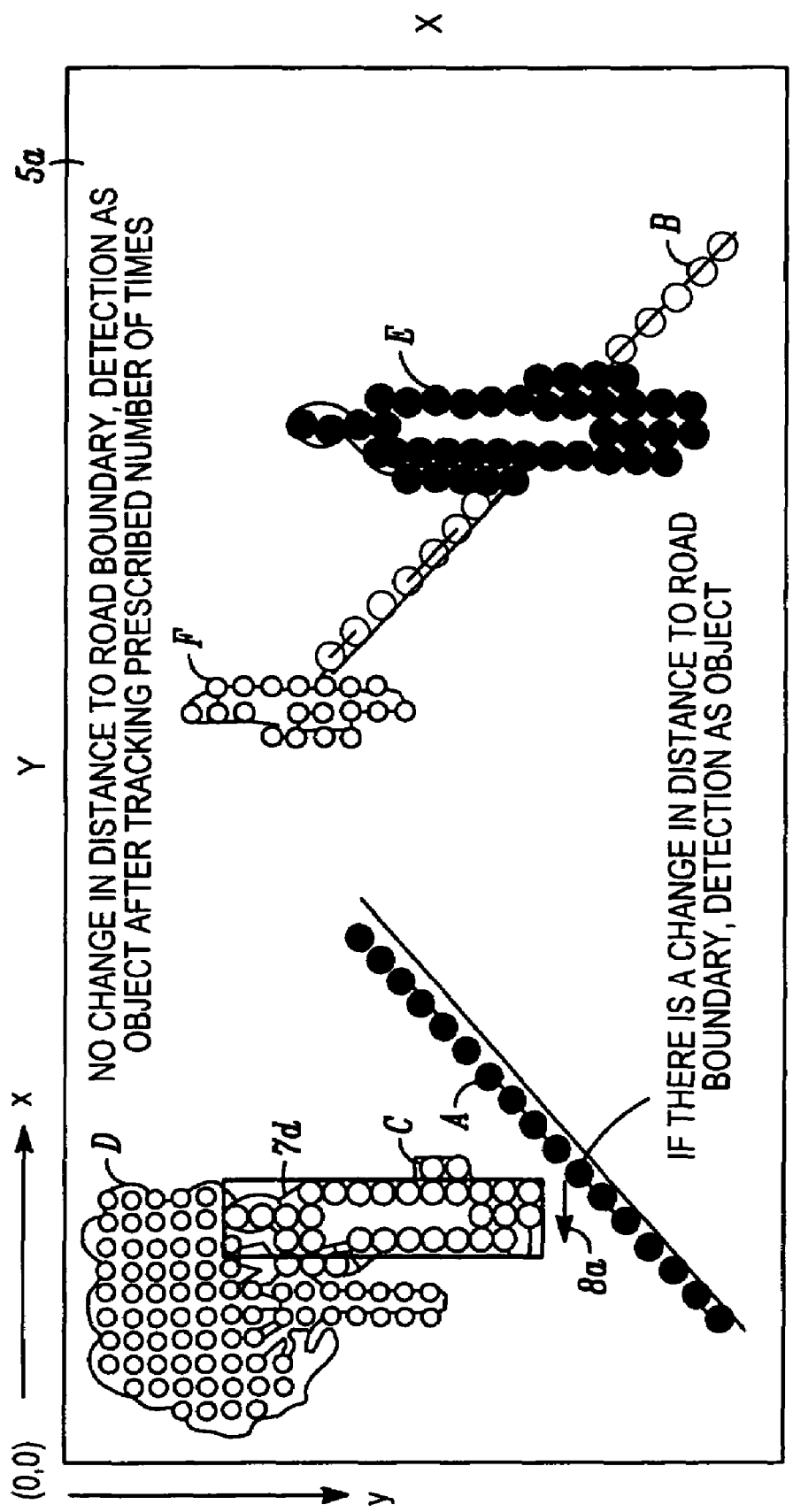
FIG. 8 shows an object detection example in the road boundary upper region in the first embodiment.

The change in relative position between an object candidate region 7d specified with the above-mentioned processing and the road boundary at the side near it, that is, white line A, is monitored between frames. If a change in the distance 8a between object candidate region 7d and white line A shown in FIG. 8 is detected, it is determined that a moving object is present in object candidate region 7d. Then, the direction of movement of the object is determined based on the change in distance. If no change in distance 8a between object candidate region 7d and white line A is detected in multiple frames, and if an object candidate region 7d that has the same velocity components continuing in multiple frames is detected, it is determined that a stationary object is present in object candidate region 7d.

In this way, if the object present in object candidate region 7d is a moving object, the object can be determined accurately taking into consideration the fact that the distance between the object and the road boundary changes with time. If the object present in object candidate region 7d is a stationary object, the reliability of object detection can be improved considering that the distance between the object and the road boundary does not change. But, if the same object continues to be detected in multiple frames, the possibility of it being an object is higher.

In contrast to this, if no change in distance 8a between an object candidate region 7d and white line A is detected between multiple frames, and if no object candidate region 7d having the same velocity components continues to be detected in multiple frames, it is determined that no object is present in that object candidate region 7d. Consequently, object candidate region 7d is deleted from velocity image 5a.

Because objects and background are separated in road boundary upper region 7a in velocity image 5a using the processing above, it can be determined that an object, that is, a stationary pedestrian C, is present in road boundary upper region 7a, and objects present in pickup image 3a can be detected.

Next, an object present in road boundary lower region 7b and an object straddling road boundary upper region 7a and road boundary lower region 7b, that is, an object straddling white lines A and B, is detected within velocity image 5a. If no boundary, such as a white line or curb, is present on the road during travel, and no road boundary appears in pickup image 3a, road boundary upper region 7a and road boundary lower region 7b cannot be established in velocity image 5a with the above-mentioned processing. Thus in this case, too, objects will be detected for all of velocity image 5a by executing the processing explained next.

Figure 9:
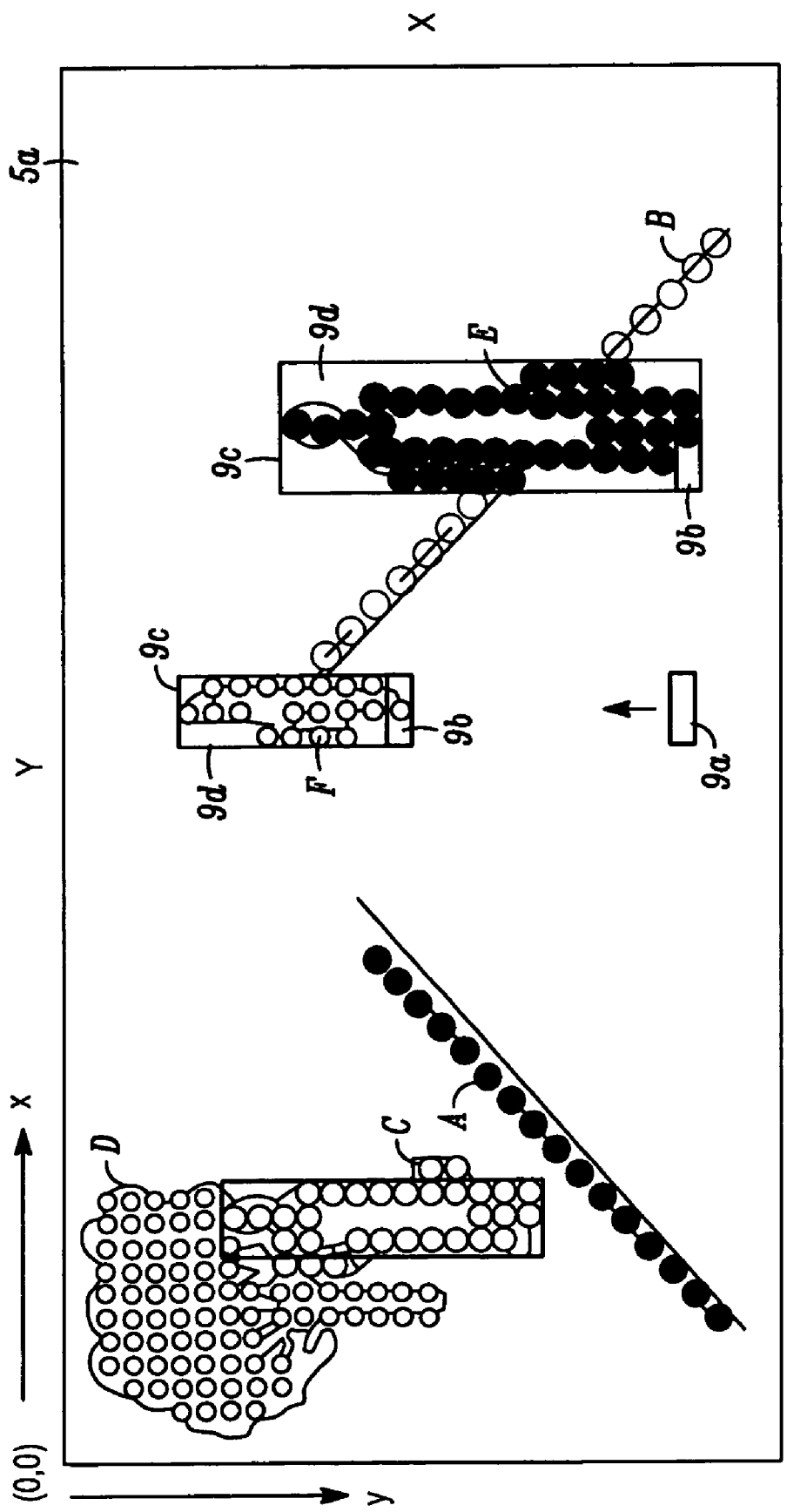
FIG. 9 shows an object detection example in the road boundary lower region in the first embodiment.

First, a region that contains a prescribed area, for example a region that is one pixel high and three pixels wide, is established as small region 9a for bottom edge detection in road boundary lower region 7b as shown in FIG. 9. The small region 9a for bottom edge detection is scanned from below in the y-axis in velocity image 5a. Then, with velocity image 5a being scanned from below, the position at which a pixel having a velocity greater than that prescribed in small region 7b for bottom edge detection is detected as the position at which the bottom edge of an object is present, that is, object bottom edge position 9b.

After this, a histogram of the velocity image along the y-axis from detected object bottom edge position 9b is constructed. That is, a histogram is constructed that represents the frequency distribution along the x-axis of pixels that have the same greater-than-prescribed velocity along the y-axis from object bottom edge position 9b. Then the sum of the frequencies in an area of reference height $y_m$ for each preset object is calculated from the following formula (1), where the coordinate value of object bottom edge position 9b at this time is $y_d$ and the frequency of pixels having the same greater-than-prescribed velocity at each y-coordinate value is $V(y_i)$.

If the sum of frequencies calculated with formula (1) is equal to or greater than prescribed value T1, it is determined that an object is present in an area in which pixels having the same greater-than-prescribed velocity are distributed. Then if it is determined that an object is present at a position greater than the reference height $y_m$ of each preset object, the position just before where frequency $V(y_i)$ of pixels that have the same greater-than-prescribed velocity in the y-coordinate value will be less than prescribed value T2, for example, the position indicated by symbol 9c in FIG. 9, is detected as the top edge position at which an object is present, that is, as object top edge position 9c.

$$\sum_{i=m}^{d} V(y_1) > T1 \qquad (1)$$

In addition, for the area between object bottom edge position 9b and object top edge position 9c, a straight line is drawn parallel to the y-axis that passes through the outermost pixels of the pixels that have the same greater-than-prescribed velocity continuing in the x-axis direction. An area enclosed by the straight line parallel to the y-axis and by object bottom edge position 9b and object top edge position 9c is specified as the area in which an object is present, i.e., an object area 9d. In this way, pixels that have the same greater-than-prescribed velocity are grouped in velocity image 5a, and an area in which an object that is present within road boundary lower region 7b and an area in which an object is straddling road boundary upper region 7a and road boundary lower region 7b can be specified.

For example, as shown in FIG. 9 object area 9d that includes pedestrians E and F straddling white line B can be specified, and pedestrians E and F can be detected from within pickup image 3a because of this.

Figure 10A:
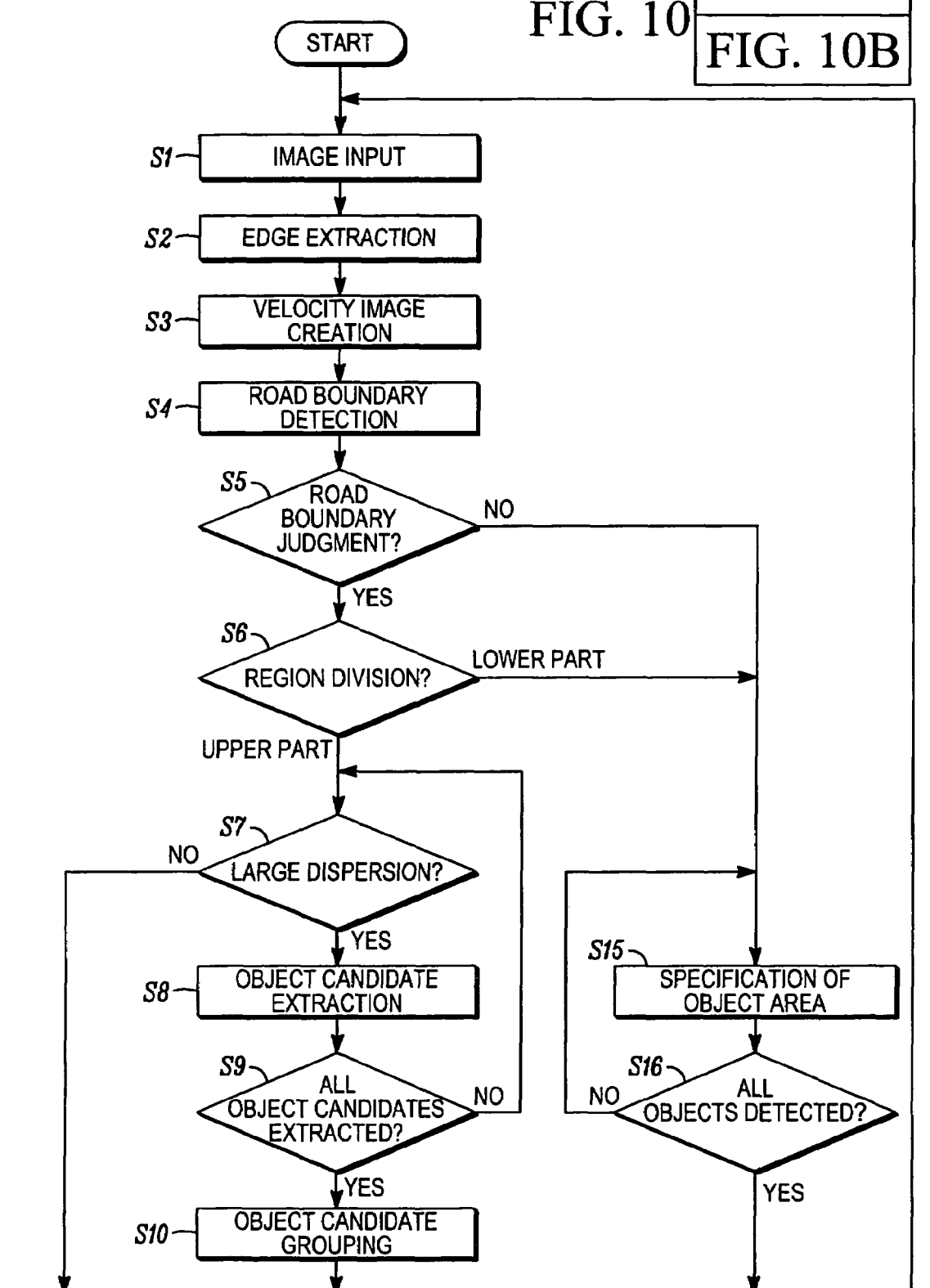
FIGS. 10A and 10B show a flow chart illustrating processing by the vehicle-mounted object detector in the first embodiment.
Figure 10B:
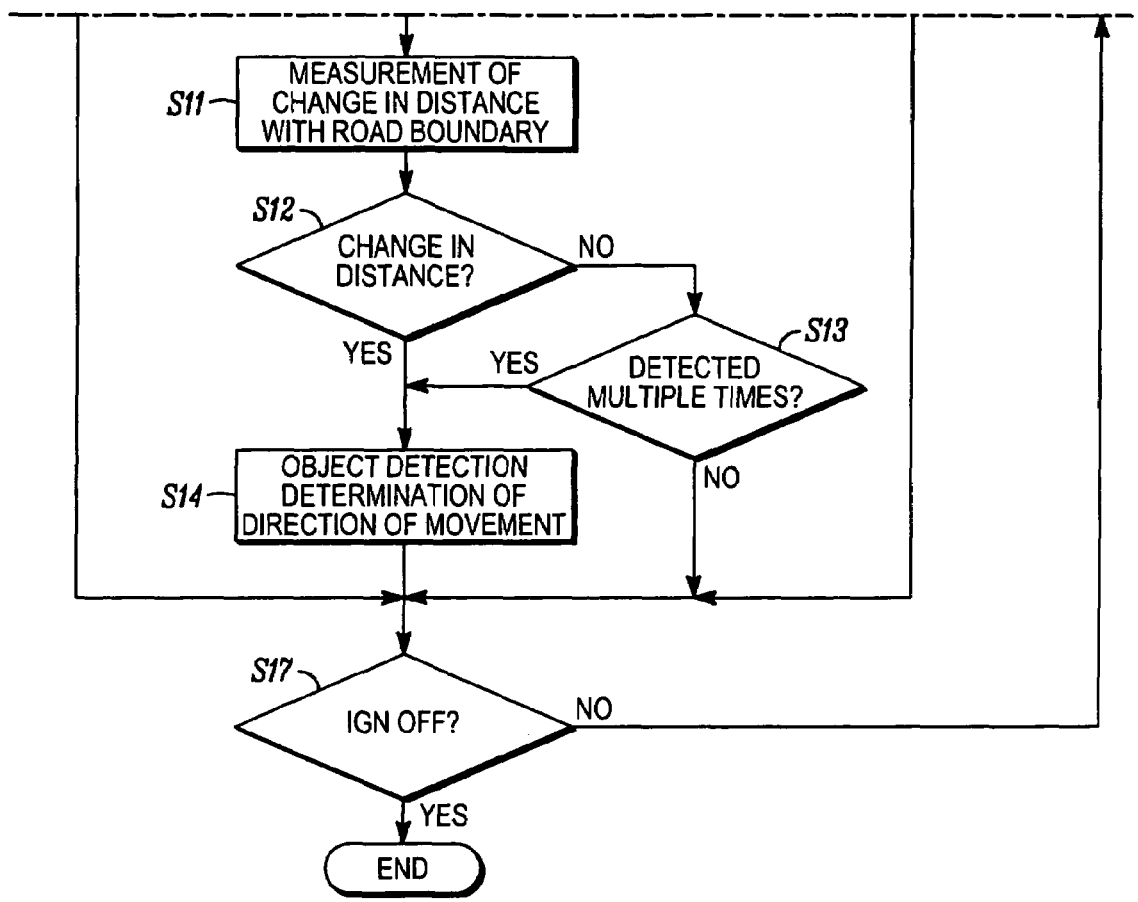

FIGS. 10A and 10B show a flow chart illustrating processing by the vehicle-mounted object detector 100 in the first embodiment. The processing illustrated in FIGS. 10A and 10B is executed by controller 103 as a program activated when power is supplied to vehicle-mounted object detector 100 by turning on the vehicle ignition switch. At step S1, pickup images 3a that are read continuously by camera 101 are read and processing advances to step S2. With step S2, a filter for edge extraction is applied to pickup image 3a to perform edge processing. After this, processing advances to step S3.

With step S3, velocity image 5a is created in which the velocity components of the edges in pickup image 3a are represented by prescribed class values, as described above, and processing advances to step S4. With step S4, road boundary detection regions for detecting the road boundaries are established on velocity image 5a, as described above, and road boundaries present in velocity image 5a are detected by detecting diagonal lines present in each road boundary detection region 6a. After this, processing advances to step S5, where it is judged whether a road boundary has been detected in velocity image 5a.

The result this query in step S5 is that if it is judged that there is no road boundary in velocity image 5a, processing advances to step S15, described below. In contrast to this, if it is judged that there is a road boundary in velocity image 5a, processing advances to step S6. In step S6, the region is divided into upper and lower areas with the detected road boundary as the border. By reference to the description above, road boundary upper region 7a and road boundary lower region 7b are established in velocity image 5a, and it is judged from which of the regions an object will be detected. To detect an object from road boundary upper region 7a, that is, from the area at the top part of the screen bordering the road boundary, processing advances to step S7.

With step S7, multiple regions having a prescribed width and vertically oriented from the bottom edge to the top edge of road boundary upper region 7a are established as object-detection regions 7c, as described above, and velocity dispersion in each object-detection region 7c is calculated. Then, it is determined whether the calculated velocity dispersion is greater than a prescribed value. The result is that if it is judged that the velocity dispersion is less than a prescribed value, processing advances to step S17. In contrast to this, if it is judged that the velocity dispersion is greater than a prescribed value, processing advances to step S8.

With step S8, object-detection regions 7c in which the velocity dispersion is greater than a prescribed value are extracted as regions in which an object candidate is present, as described above. After this, processing advances to step S9, where it is determined whether all object candidates have been extracted from velocity image 5a. If it is judged that extraction is not complete, processing returns to step S7 and extraction is continued. In contrast to this, if it is judged that all object candidates have been extracted from velocity image 5a, processing advances to step S10.

With step S10, velocity components of adjacent object-detection regions 7c are compared in object-detection regions 7c in which an object candidate is present. If these regions have the same velocity components, it is determined that the same object candidates are present in the object-detection regions 7c having the same velocity components. Those object detection candidate regions 7c are joined, that is, grouped, and above-mentioned object candidate region 7d is obtained. After this, processing advances to step S11 where changes in distance between frames of the specified object candidate region 7d and the road boundary on the side near it are measured. Processing then advances to step S12.

With step S12, it is judged whether the distance between the two has changed between frames. If it is judged that the distance between the two has changed between frames, processing advances to step S14. In step S14 object detection is performed by judging whether a moving object is present in object candidate region 7d, and the direction of the movement of the object is simultaneously determined. After this, processing advances to step S17 described below. Alternately, if it is judged that the distance between the two has not changed between frames, processing advances to step S13.

With step S13, it is determined whether object candidate regions 7d that have the same velocity components continuing in multiple frames were detected. If the result is judged affirmative processing advances to step S14. After object detection is performed by determining whether a stationary object is present in object candidate region 7d, processing advances to step S17 described below. On the other hand, if the result of the query in step S13 is judged negative, processing advances directly to step S17 described below.

Next, the processing at step S15 will be explained, which is executed if it is judged that there are no road boundaries in velocity image 5a at step S5, or if it is judged at step S6 that the velocity components in object-detection region 7c are not greater than a prescribed value. With step S15, object bottom edge position 9b and object top edge position 9c are detected from velocity image 5a as described above, and object area 9d is specified. Then the objects are detected by determining whether objects are present in object areas 9d. After this, processing advances to step S16. At step S16, it is judged whether all objects have been detected inside velocity image 5a. If the detection of all objects is not complete, step S15 is repeated. If it is determined that detection of all objects is complete, processing advances to step S17.

In step S17, it is judged whether the vehicle ignition switch is off. If it is judged that the vehicle ignition switch is not off, processing returns to step S1 and is repeated. In contrast to this, if it is judged that the vehicle ignition switch is off, processing is complete.

With the first embodiment explained above, the following functionality and effects can be obtained. First, road boundaries are detected inside velocity image 5a. If a road boundary is detected, the region is divided into top and bottom areas with the road boundary as border, and objects are detected with different detection methods described for the above-mentioned road boundary upper region 7a and road boundary lower region 7b in velocity image 5a. In this way, objects can be detected with high precision by taking into consideration that the speed of movement of the background in the image differs when above or below (or, outside or inside) the road boundary.

Second, in road boundary upper region 7a the velocity dispersion in each object-detection region 7c is calculated. If the calculated velocity dispersion is greater than a prescribed value, it is determined that an object candidate is present in that object-detection region 7c. On the other hand, if the calculated velocity dispersion is less than a prescribed value, it is determined that background is present in that object-detection region 7c. In this way, object candidates and background present in velocity image 5a are separated with high precision, taking into consideration that in a region above a road boundary, a velocity difference occurs due to the difference in depth between objects and background.

Third, in road boundary upper region 7a changes in relative positions between object candidate region 7d and the road boundary on the side near it are monitored between frames, and if a change in distance between the two is detected, it is determined that a moving object is present in object candidate region 7d. If no change in distance between object candidate region 7d and the road boundary is detected in multiple frames, it is determined that a stationary object is present in object candidate region 7d. In this way if the object present in object candidate region 7d is a moving object it can be determined accurately, taking into consideration that the distance between the object and the road boundary changes with time. If the object present in object candidate region 7d is a stationary object, reliability of object detection can be improved by taking into consideration that when the distance between the object and the road boundary does not change, and if the same object candidate continues to be detected in multiple frames, there is a higher probability that it is an object.

Fourth, changes in relative positions between object candidate region 7d and the road boundary on the side near it are monitored between frames. If a change in distance between the two is detected it is determined that a moving object is present in object candidate region 7d, and the direction of movement of the moving object is also determined based on the change in distance. In this way, the direction of movement of a moving object can be detected accurately using the road boundary as reference.

Fifth, in road boundary lower region 7b velocity image 5a is scanned from below. A position in which pixels having a greater-than-prescribed velocity are detected as object bottom edge position 9b. By specifying the upper limit of the area above that in which the pixels having the same velocity are present object top edge position 9c is detected to determine object area 9d. In this way, in road boundary lower region 7b in which primarily road appears, objects and background can be separated with high precision by taking into consideration that the bottom edge of the object touching the road surface and that the speed of movement of the object is generally greater than a prescribed value.

With the second embodiment, objects and background are separated by comparing the velocity components of adjacent object-detection regions 7c when objects present in road boundary upper region 7a are detected. Here, the block diagram of the vehicle-mounted object detector shown in FIG. 1, the example of the installation of camera 101 on the vehicle shown in FIG. 2, and the example of the edge normalization method shown in FIGS. 4A-4C are the same as in the first embodiment, so explanations will be omitted.

Figure 11:
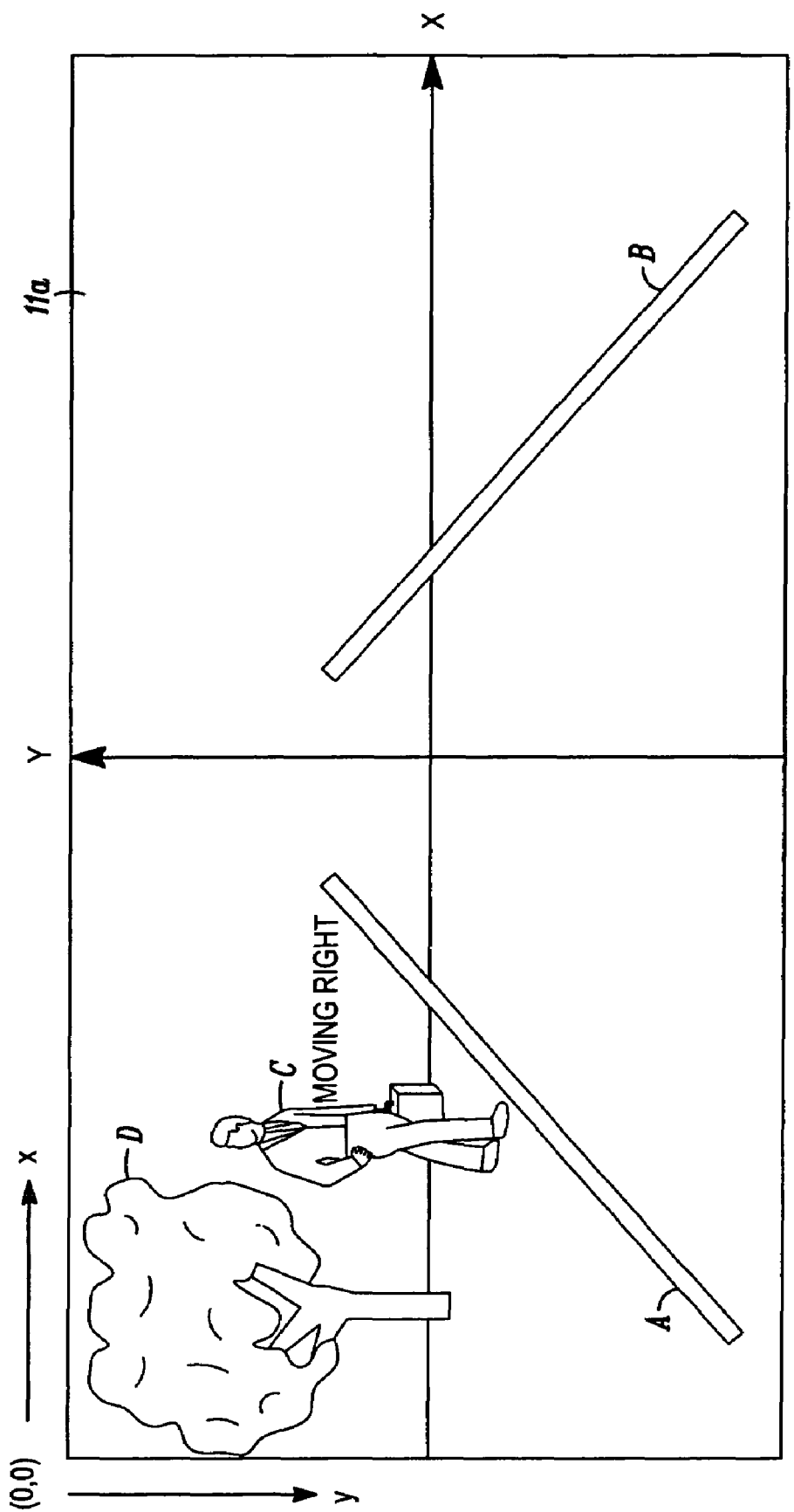
FIG. 11 shows an example of a pickup image in a second embodiment.

Processing described below according to the second embodiment is executed for pickup image 11a shown in FIG. 11, and the method of detecting objects inside pickup image 11a by separating objects and background will be explained. Pickup image 11a includes road boundaries present on the left and right sides of the path, that is, white lines A and B, a pedestrian (person) C present in front of the vehicle and moving toward the right, and a stationary background tree D.

Figure 12:
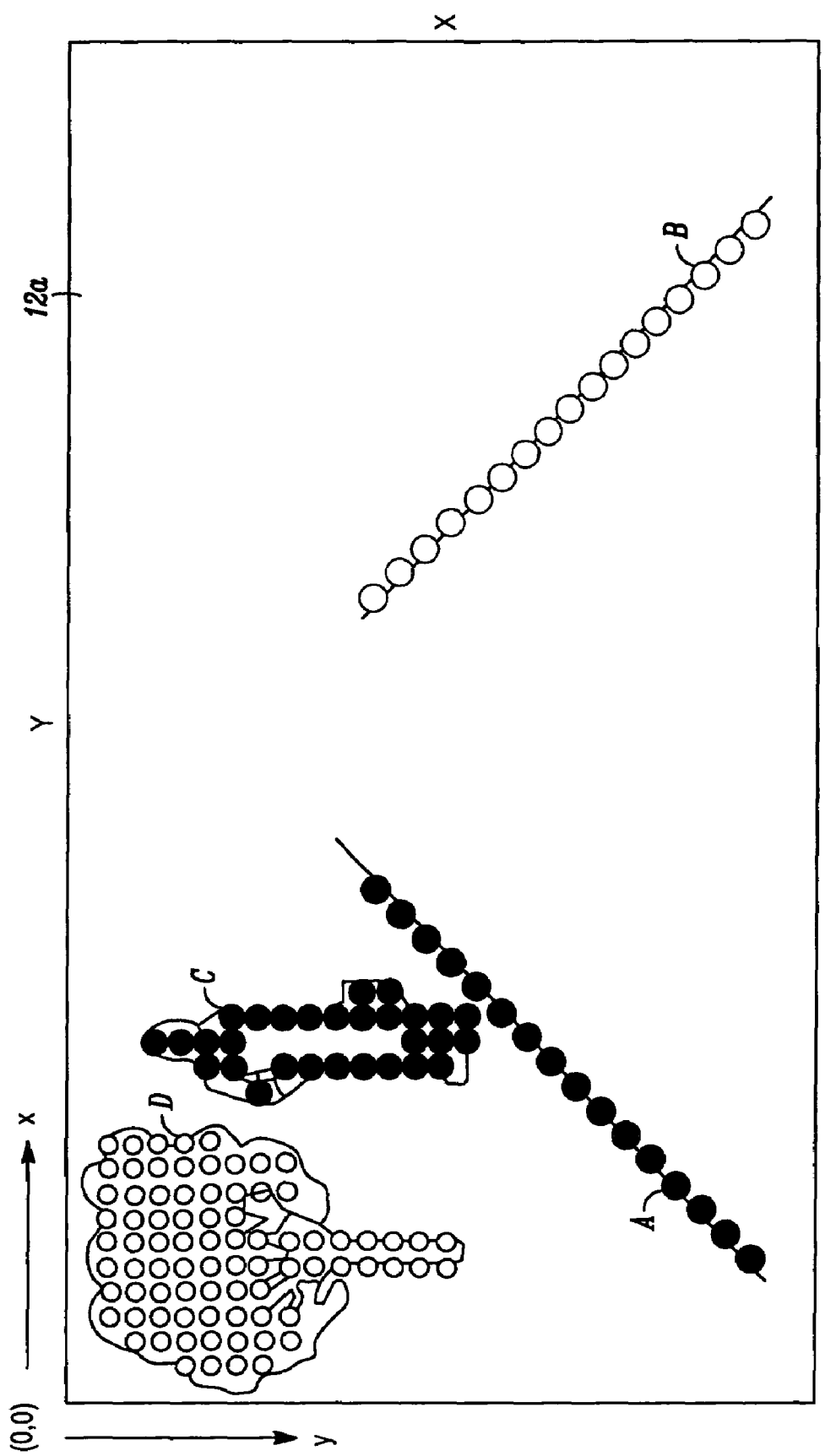
FIG. 12 shows an example of a velocity image in the second embodiment.

A velocity image 12a is created as shown in FIG. 12 based on pickup image 11a in the same manner as the velocity image 5a is created in the above-mentioned first embodiment based on pickup image 3a. In this velocity image 12a, too, pixels in which lateral velocity is detected are represented by round dots and the dots are made larger for pixels with a faster speed of movement. In this way, the class values of the velocity components are assigned. The direction of movement is also indicated by representing velocity toward the right with black dots and by representing velocity toward the left with white dots. That is, with velocity image 12a velocity toward the right side of the image is detected from white line A on the left side of the road and pedestrian C moving toward the right, and velocity toward the left side of the image is detected from white line B on the right side of the road and tree D.

Next road boundaries, that is, white lines A and B, are detected inside velocity image 12a in the same way as in the first embodiment, and velocity image 12a is divided into top and bottom areas by considering the area above detected white lines A and B to be road boundary upper region 7a and the area below white lines A and B to be road boundary lower region 7b. Objects are separated from the background and the objects are detected using the same processing as with the above-mentioned first embodiment for objects present in road boundary lower region 7b and for objects straddling road boundary upper region 7a and road boundary lower region 7b.

Figure 13:
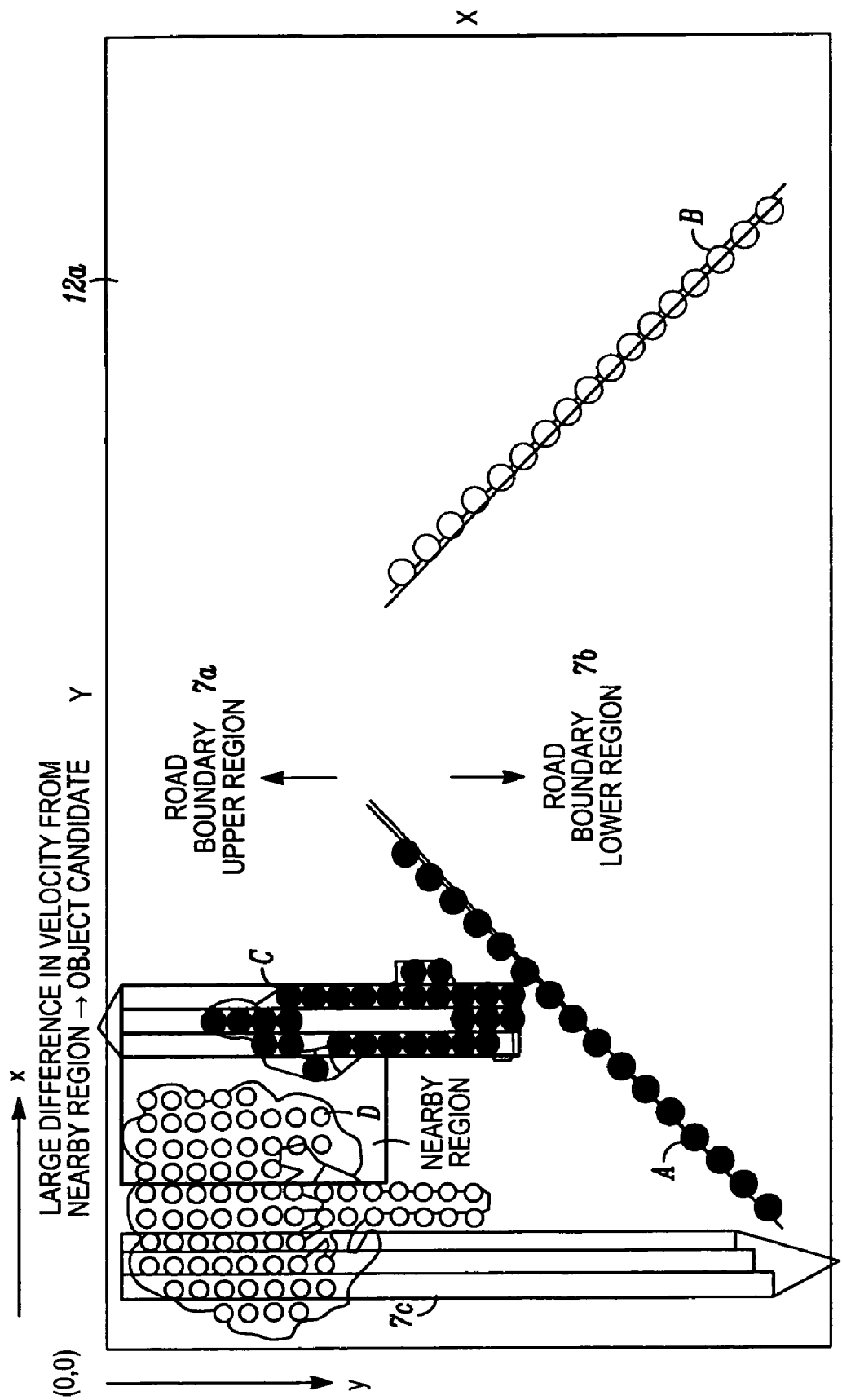
FIG. 13 shows an example of dividing the velocity image according to FIG. 12 into a road boundary upper region and a road boundary lower region in the second embodiment.

In contrast to the first embodiment, objects present in road boundary upper region 7a are detected as follows. As shown in FIG. 13, object-detection regions 7c are established in road boundary upper region 7a in the same way as in the first embodiment, and the velocity dispersion in each object-detection region 7c is calculated. Then, if the calculated velocity dispersion is greater than a prescribed value it is determined that an object candidate is present in that object-detection region 7c.

On the other hand, when the calculated velocity dispersion is less than a prescribed value it would be determined that background is present in that object-detection region 7c based upon the first embodiment. However, when an object that is moving laterally is present, for example, there is the possibility of it being an instance when velocity dispersion in the vertical orientation is less than the prescribed value, and there is the possibility that such a laterally-oriented moving object cannot be detected. For this reason, with the second embodiment, processing as follows is performed to detect a laterally-oriented moving object from an object-detection region 7c in which velocity dispersion is less than a prescribed value.

Specifically, the average velocity in each object-detection region 7c is calculated. If the difference between the average velocity of any object-detection region 7c and an adjacent object-detection region 7c is greater than a prescribed value, it is determined that an object candidate for moving laterally (a laterally-moving object) is present in the object-detection region 7c. It is also determined that the possibility that background is present in the adjacent object-detection region 7c is high.

Figure 14:
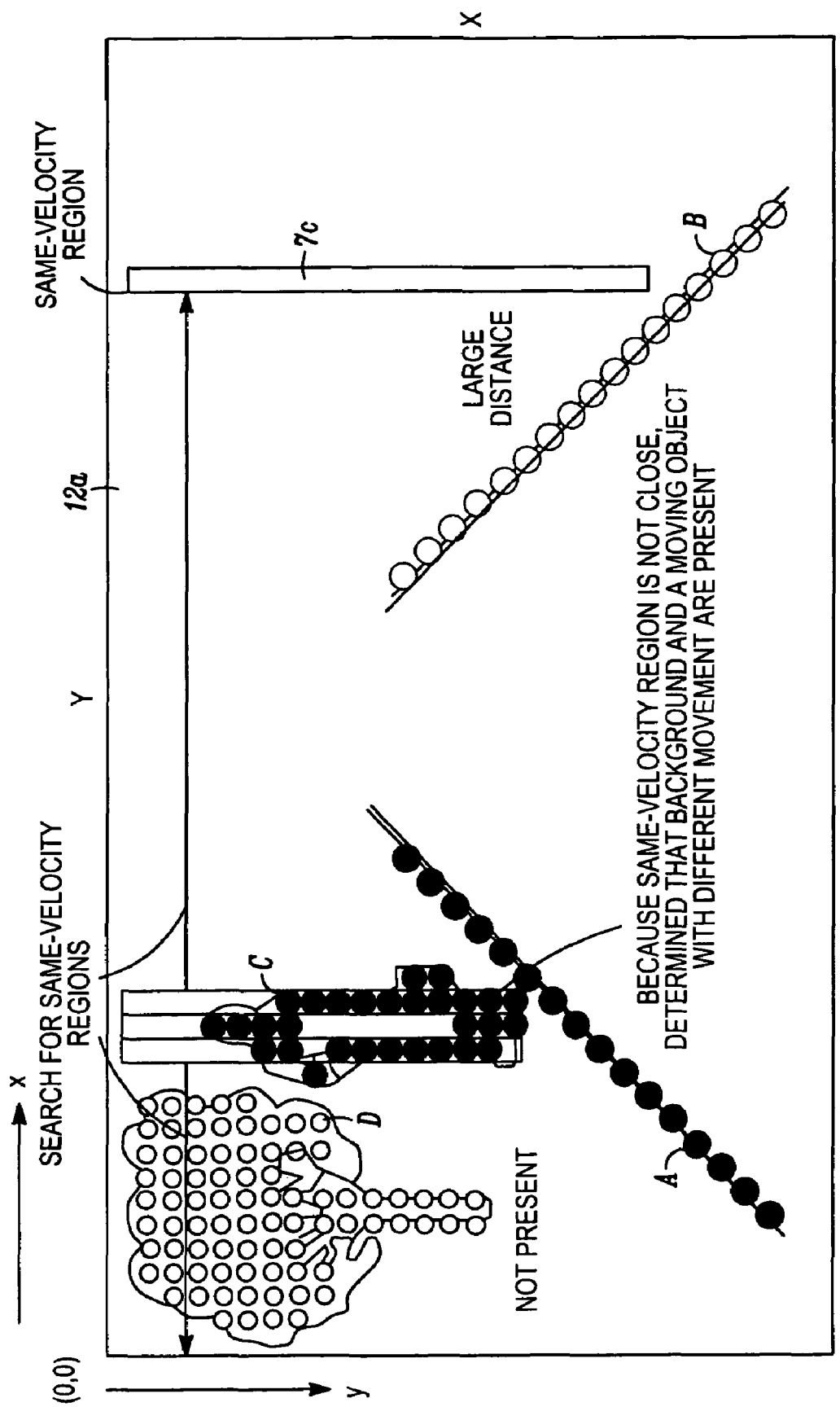
FIG. 14 is a first figure showing an object detection example in the road boundary upper region in the second embodiment.

Then, as shown in FIG. 14 scanning is performed on both left and right sides of the object-detection region 7c in which it was determined that a laterally moving object candidate is present. When an object-detection region 7c that has the same velocity components as said object-detection region 7c is present on the left or right, it is determined that the same laterally moving object candidate is present in these object-detection regions 7c having the same velocity components. The object detection candidate regions 7c are then joined. In addition, the area that has the same velocity components as the above-mentioned object candidate detection regions 7c in which the possibility that background is present is high is excluded from the object detection candidate region.

Figure 15:
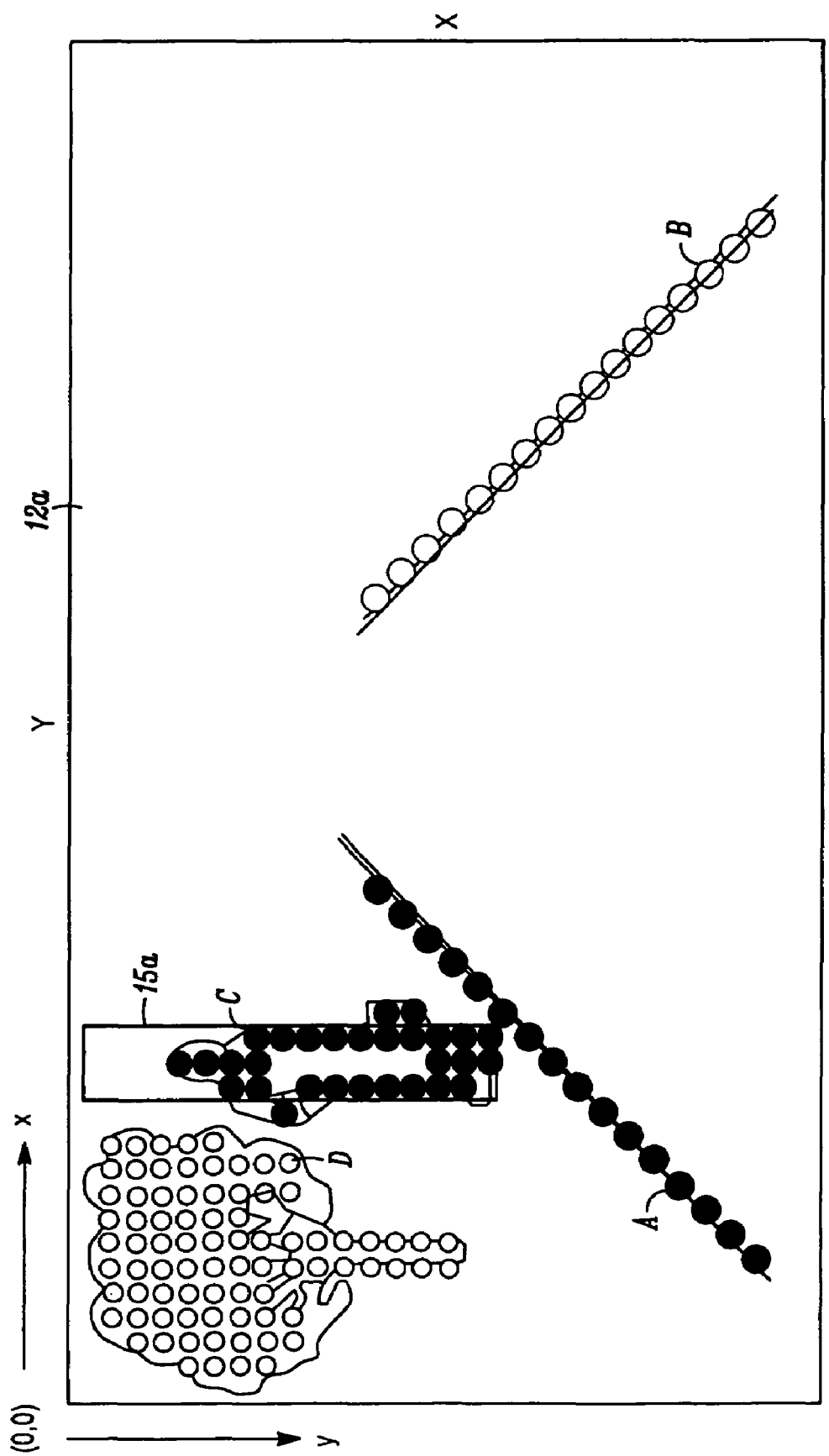
FIG. 15 is a second figure showing an object detection example in the road boundary upper region in the second embodiment.

In this way, as shown in FIG. 15, the top edge position and the bottom edge position of a lateral movement candidate are specified, the area in which a laterally moving object candidate is present and the area in which background is present are separated, and laterally moving object candidate region 15a can be specified. Then, when laterally moving object candidate region 15a that is specified in this way continues to be detected in multiple frames, it is determined that a laterally moving object is present in laterally moving object candidate region 15a. Consequently, laterally moving objects and background can be separated with high precision and laterally moving objects can be detected within road boundary upper region 7a, taking into consideration that the speeds of movement of laterally moving objects and background in the image are different.

Figure 16B:
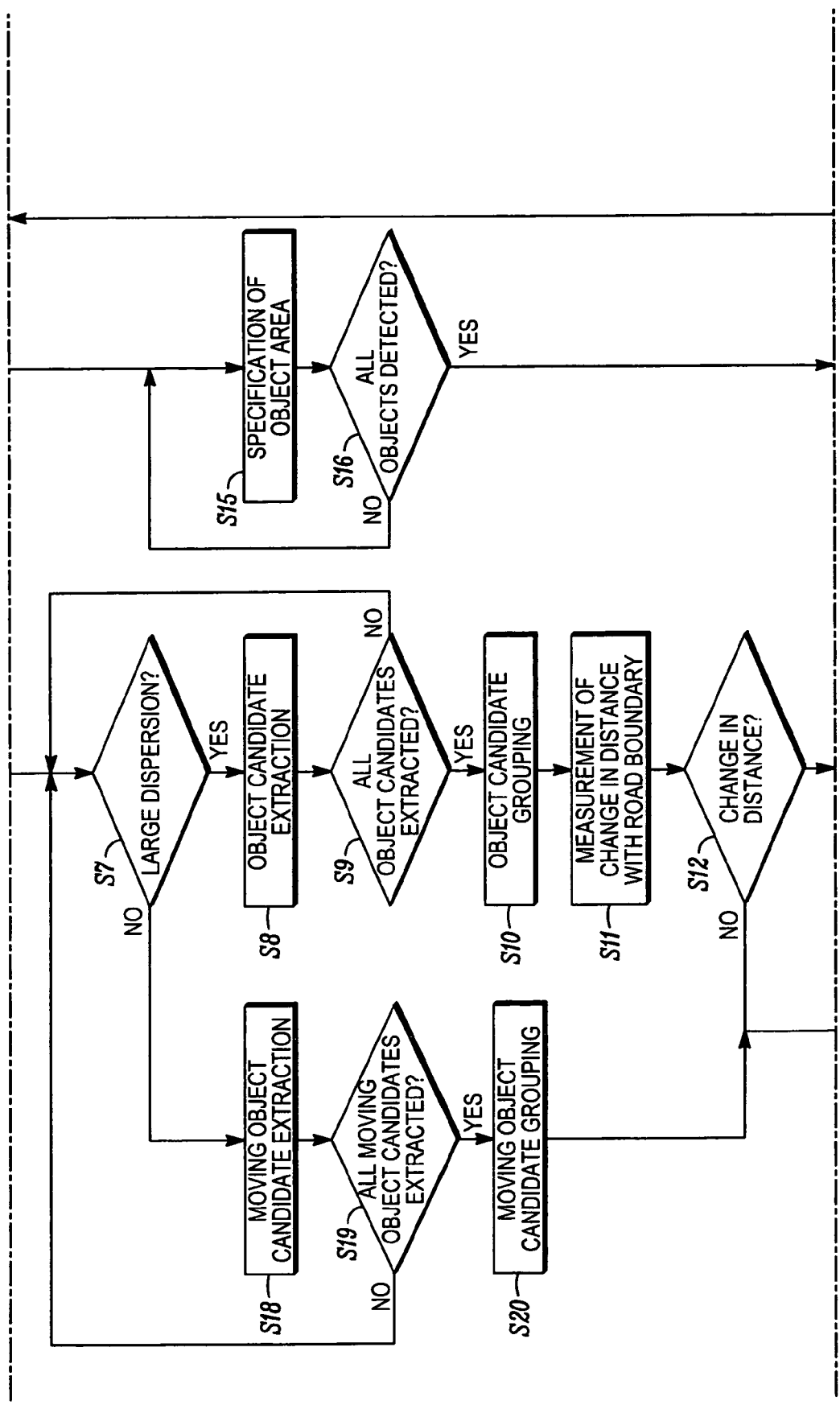
Figure 16C:
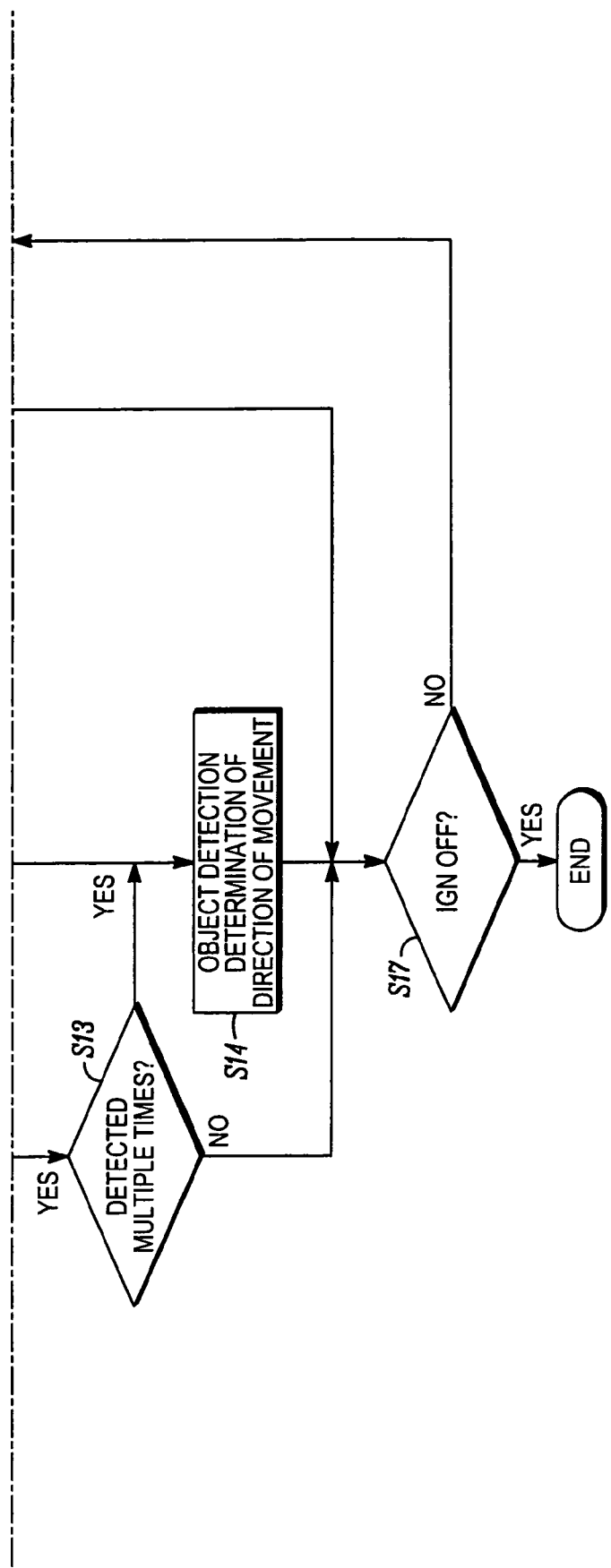

FIGS. 16A-16C show a flow chart illustrating processing by vehicle-mounted object detector 100 in the second embodiment. The processing shown in FIGS. 16A-16C is executed by controller 103 as a program activated when the power is supplied to vehicle-mounted object detector 100 by turning on the vehicle ignition switch. Here, the same step numbers used in FIG. 10 in the first embodiment are assigned; the explanation below focuses merely on the differences.

At step S7, if it is judged that the velocity dispersion is less than a prescribed value, processing advances to step S18. With step S18, object-detection regions 7c in which a laterally moving object candidate is present are extracted, as described above. After this, processing advances to step S19 where it is determined whether object extraction has been performed for all of road boundary upper region 7a. If it is judged that extraction is not finished for all of road boundary extraction region 7a, processing returns to step S7 and repeats. In contrast, if it is judged that extraction is complete, processing advances to step S20.

In step S20, scanning is done on both the left and right sides of the extracted object-detection regions 7c in which a laterally moving object candidate is present. Then, when an object-detection region 7c that has the same velocity components as said object candidate regions 7c is present on the left or right, it is determined that the same laterally moving object candidate is present in the object-detection regions 7c having the same velocity components. These object detection candidate regions 7c are grouped. After this, processing advances to step S13.

With the second embodiment explained above, in addition to the function and effects in the first embodiment, the following effects can be obtained. First, when velocity dispersion in an object-detection region 7c is less than a prescribed value, the average velocity in the object-detection region 7c is calculated. If the difference in the average value between any object-detection region 7c and an object-detection region 7c adjacent to it is greater than a prescribed value, it is determined that a laterally moving object candidate is present in the subject object-detection region 7c. That is, objects are detected based on differences in velocity in adjacent object-detection region 7c. In this way, if a laterally moving object is present, there is the possibility that it will be an instance in which dispersion in the vertical orientation is less than the prescribed value. Even in a case in which such an laterally moving object cannot be detected, by taking into consideration that the speed of movement of a laterally moving object and the background in the image is different, laterally moving objects can be detected with high precision.

Second, to specify laterally moving object candidate region 15a scanning is done on both left and right sides of an object-detection region 7c for which it was determined that a laterally moving object candidate is present. If an object-detection region 7c that has the same velocity components as the subject object-detection region 7c is present on the right or left, these object detection candidate regions 7c are joined. In this way, it can be determined that the same laterally moving object candidate is present in object-detection regions 7c that have the same velocity components as the object-detection region 7c in which a laterally moving object candidate is present. As a result, individual moving objects can be detected accurately.

Many variations of the vehicle-mounted object detector in the above-described embodiments are possible. For example, in the above-described first and second embodiments examples were described in which velocity diagrams 5a and 12a are calculated using the class values shown in FIG. 5 and FIG. 12. However, there is no restriction on this, and velocity images represented by other class values could also be calculated.

Also, in the above-described first and second embodiments examples were explained in which images in front of the vehicle are picked up by camera 101 to detect objects present in front of the vehicle. The invention is not limited to this however. For example, application of the principles taught herein is also possible when camera 101 picks up images behind the vehicle in order to detect objects behind the vehicle.

In the above-described second embodiment, an example was explained in which laterally moving object candidate region 15a is specified in road boundary upper region 7a based on differences in velocity in adjacent object-detection regions 7c to detect laterally moving objects. The invention is not limited to this teaching. In another possible variation, the direction of movement of laterally moving objects present in road boundary upper region 7a could additionally be determined based on changes in distance between laterally moving object candidate region 15a and the road boundary, the same as in the first embodiment.

This application is based on Japanese Patent Application No. 2005-081511, filed Mar. 22, 2005, in the Japanese Patent Office, the entire contents of which are hereby incorporated by reference.

The above-described embodiments have been described in order to allow easy understanding of the present invention, and do not limit the present invention. On the contrary, the invention is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for detecting an object in at least one image, comprising:
    an image pickup device mounted on a vehicle, the image pickup device capturing an image; and
    a controller coupled to the image pickup device; wherein the controller is operable to extract pixels of the image captured by the image pickup device, to calculate a side direction velocity component based upon the extracted pixels, to detect a road boundary based upon the calculated side direction velocity component, and to detect a moving direction of the object based upon a relationship between the road boundary and the object.

2. The apparatus according to claim 1 wherein the controller is operable to detect the distance between the road boundary and the object, and to detect the moving direction of the object from a change in distance between the road boundary and the object.

3. The apparatus according to claim 1 wherein the controller is operable to divide an area outside the road boundary into object-detection regions of a prescribed size, and to separate an object present in the area from a background based on velocity dispersion in each object-detection region.

4. The apparatus according to claim 1 wherein the controller is operable to divide an area outside the road boundary into object-detection regions of a prescribed size, and to separate an object preset in the area and a background based on the difference in the velocity of edges between adjacent object-detection regions.

5. The apparatus according to claim 1 wherein the controller is operable to specify a bottom edge position and a top edge position of the object based on the lateral speed of movement of an edge in a velocity image, the object being located within the road boundary.

6. The apparatus according to claim 1 wherein the controller is operable to detect an object straddling the road boundary by specifying a top edge position and a bottom edge position of the object straddling the road boundary, the top edge and the bottom edge specified based on the lateral speed of movement of an edge in an image.

7. An apparatus for detecting objects in an image obtained by an image pick-up device mounted on a vehicle, comprising:
   edge-extraction means for extracting edges of at least one object present in multiple image frames;
   road boundary detection means for detecting a road boundary in the image based on respective lateral speeds of movement of at least some of the extracted edges; and
   direction-of-movement determination means for determining a direction of movement of an object based on the road boundary and respective lateral speeds of movement of others of the extracted edges.

8. The apparatus according to claim 7, further comprising:
   edge velocity calculation means for calculating the respective lateral speeds of movement of the extracted edges based upon at least two image frames.

9. The apparatus according to claim 7 wherein the direction-of-movement determination means further comprises means for monitoring a change in distance in at least two image frames between the object and the road boundary, the change in distance indicating the direction of movement of the object.

10. The apparatus according to claim 7, further comprising:
   means for dividing an area outside the road boundary into object-detection regions of a prescribed size; and
   means for separating the object from a background based on velocity dispersion in each object-detection region.

11. The apparatus according to claim 7, further comprising:
   means for dividing an area outside the road boundary into object-detection regions of a prescribed size; and
   wherein the direction-of movement determination means further includes means for separating the object from a background based on a difference in the lateral speed of movement of extracted edges between adjacent object-detection regions.

12. The apparatus according to claim 7, further comprising:
   means for scanning a velocity image including a plurality of pixels and a lateral speed of movement associated with respective ones of the plurality of pixels;
   means for defining a bottom edge position of the object by comparing a lateral speed of movement of a pixel to a prescribed velocity; and
   means for defining a top edge position of the object based upon a grouping of pixels having the same lateral speed of movement of the pixel.

13. The apparatus according to claim 7 wherein the direction-of-movement determination means further includes selection means for selecting one method of determining the direction of movement when the object is outside the road boundary and for selecting another method of determining the direction of movement when the object is one of straddling the road boundary and inside the road boundary.

14. A method of detecting objects in an image obtained by an image pick-up device mounted on a vehicle, comprising:
   extracting edges of at least one object present in multiple image frames;
   detecting a road boundary in the image based on respective lateral speeds of movement of at least some of the extracted edges; and
   determining a direction of movement of an object based on the road boundary and respective lateral speeds of movement of others of the extracted edges.

15. The method according to claim 14, further comprising:
   calculating a lateral speed of movement in the image of the extracted edges based upon at least two image frames.

16. The method according to claim 14 wherein determining a direction of movement further comprises monitoring a change in distance in at least two image frames between the object and the road boundary, the change in distance indicating the direction of movement of the object.

17. The method according to claim 14, further comprising:
   dividing an area outside the road boundary into object-detection regions of a prescribed size; and
   separating the object from a background based on velocity dispersion in each object-detection region.

18. The method according to claim 14, further comprising:
   dividing an area outside the road boundary into object-detection regions of a prescribed size; and
   separating the object from a background based on a difference in the lateral speed of movement of extracted edges between adjacent object-detection regions.

19. The method according to claim 14, further comprising:
   creating a velocity image including a plurality of pixels and a lateral speed of movement associated with respective ones of the plurality of pixels;
   scanning the velocity image using a scanning area;
   defining a bottom edge position of the object by comparing a lateral speed of movement of a pixel within the scanning area to a prescribed velocity; and
   defining a top edge position of the object based upon a grouping of pixels having the same lateral speed of movement of the pixel.

20. The method according to claim 14, further comprising:
   selecting one method of determining the direction of movement when the object is outside the road boundary; and
   selecting another method of determining the direction of movement when the object is one of straddling the road boundary and inside the road boundary.

21. A method of detecting objects in an image obtained by an image pick-up device mounted on a vehicle, comprising:
   extracting edges of at least one object present in multiple image frames;
   determining an existence of a road boundary in the image based on respective lateral speeds of movement of at least some of the extracted edges;
   determining a direction of movement of an object according to a first method when the object is outside the road boundary; and
   determining the direction of movement of the object according to a second method when one of the road boundary does not exist and at least a portion of the object is inside the road boundary.

* * * * *